(12) United States Patent
Fouse et al.

(10) Patent No.: US 12,242,981 B1
(45) Date of Patent: Mar. 4, 2025

(54) CONTEXTUALIZED HUMAN MACHINE SYSTEMS AND METHODS OF USE

(71) Applicant: Aptima, Inc., Woburn, MA (US)

(72) Inventors: Adam Fouse, Medford, MA (US);
Ryan Mullins, Somerville, MA (US)

(73) Assignee: Aptima, Inc., Woburn, MA (US)

( * ) Notice: Subject to any disclaimer, the term of this patent is extended or adjusted under 35 U.S.C. 154(b) by 996 days.

(21) Appl. No.: 17/143,152

(22) Filed: Jan. 6, 2021

Related U.S. Application Data

(60) Provisional application No. 62/985,123, filed on Mar. 4, 2020.

(51) Int. Cl.
*G06N 5/02* (2023.01)
*G06F 40/30* (2020.01)
*G06N 5/04* (2023.01)

(52) U.S. Cl.
CPC .............. *G06N 5/04* (2013.01); *G06F 40/30* (2020.01); *G06N 5/02* (2013.01)

(58) Field of Classification Search
CPC ............ G06N 5/04; G06N 5/02; G06F 40/30
See application file for complete search history.

(56) References Cited

U.S. PATENT DOCUMENTS

| | | | | |
|---|---|---|---|---|
| 2009/0307174 | A1* | 12/2009 | Devarakonda | G06Q 10/06 706/48 |
| 2020/0401908 | A1* | 12/2020 | Ortega | G06V 10/762 |
| 2021/0019341 | A1* | 1/2021 | Kraus | G06F 16/243 |
| 2021/0097136 | A1* | 4/2021 | Zhou | G06F 40/211 |

FOREIGN PATENT DOCUMENTS

| | | | | |
|---|---|---|---|---|
| CN | 110781311 | A * | 2/2020 | ........... G06F 16/288 |
| EP | 3113042 | A1 * | 1/2017 | |
| WO | WO-2017187401 | A1 * | 11/2017 | |

OTHER PUBLICATIONS

Zuo, Zhang, Hung-Hsuan Huang, and Kyoji Kawagoe. "Evaluation of a Similarity Search Method for Human Behavior (Extended LDSD)." In Proceedings of the International MultiConference of Engineers and Computer Scientists, vol. 1. 2015. (Year: 2015).*
Epp, C. et al., "Identifying Emotional States using Keystroke Dynamics", CHI 2011 Session: Emotional States, Advance Technical Conference, May 7-12, 2011, Vancouver, BC, Canada, 10 pgs.

(Continued)

*Primary Examiner* — Casey R. Garner

(74) *Attorney, Agent, or Firm* — John J. Brooks, III

(57) ABSTRACT

A contextualized human machine system is provided comprising a context engine and a user interface configured to communicate a recommended data to a user. In some embodiments, the context engine selects the recommended data based on an activity of the user. In some embodiments, the input of the user comprises a chat stream of the user. In some embodiments, the recommended data comprises one of a video product, a hyperlink to information or a suggestion for annotating a product. In some embodiments, the context engine is configured to represent user activity, content, mission and actor as nodes in a multi-layer knowledge graph.

15 Claims, 12 Drawing Sheets

(56) References Cited

OTHER PUBLICATIONS

Billman, D. et al., "Benefits of Matching Domain Structure for Planning Software: The Right Stuff," in Proceedings of the SIGCHI Conference on Human Factors in Computing Systems, CHI 2011, Session: Methods to Aid and Structure Design, Association of Computing Machinery, May 7-12, 2011, Vancouver, BC, Canada, pp. 2521-2530, 10 pgs.

Colombo-Mendoza, L. O. et al., "RecomMetz: A context-aware knowledge-based mobile recommender system for movie showtimes," Expert Systems with Applications, vol. 42, No. 3, pp. 1202-1222, (2015), 21 pgs.

Cowley, P. et al., "Glass Box: Capturing, Archiving, and Retrieving Workstation Activities," in Proceedings of the 3rd ACM workshop on Continuous Archival and Retrieval of Personal Experiences, pp. 13-18, Association of Computing Machinery, Richland, WA, (2006), 6 pgs.

Deufemia, V. et al., "Capturing users interest from human-computer interaction logging," in International Conference on Web Information Systems and Technologies, pp. 312-327, Springer, (2012), Fisciano (SA), Italy, 16 pgs.

Dey, A. K. et al., "A Conceptual Framework and a Toolkit for Supporting the Rapid Prototyping of Context-Aware Applications," Human-Computer Interaction, vol. 16, No. 2-4, pp. 97-166, (2001), 67 pgs.

Dou, W. et al., "Recovering Reasoning Processes From User Interactions," IEEE Computer Graphics and Applications, vol. 29, No. 3, (2009), pp. 52-61.

Ehrlinger, L. et al., "Towards a Definition of Knowledge Graphs," Semantics (Posters, Demos, SuCCESS), vol. 48, (2016), 4 pgs.

Fouse, A. et al., "The Evolution of User Experiences and Interfaces for Delivering Context-Aware Recommendations to Information Analysts," in International Conference on Applied Human Factors and Ergonomics, pp. 15-26, Springer, (2017).

Fowler, M., "Event Sourcing," web page, https://martinfowler.com/eaaDev/EventSourcing.html, Dec. 18, 2005. Retrieved Dec. 29, 2020, 21 pgs.

Francis, J. et al., "Context Intelligence in Pervasive ENPnvironments," in 2017 IEEE/ACM Second International Conference on Internet-of-Things Design and Implementation (IoTDI), IEEE, (2017), pp. 315-316.

Ganberg, G. et al., "Representing Context Using the Context for Human and Automation Teams Model," in Workshops at the Twenty-Fifth AAAI Conference on Artificial Intelligence, (2011), Woburn, Massachusetts, 6 pgs.

Gomez-Uribe, C. A. et al., "The Netflix Recommender System: Algorithms, Business Value, and Innovation", ACM Transaction Management Information Systems, vol. 6, No. 4, Article 13, (Dec. 2015), 19 pages.

Hinbarji, Z. et al., "LoggerMan, a Comprehensive Logging and Visualization Tool to Capture Computer Usage," in International Conference on Multimedia Modeling, Insight Centre for Data Analytics, Dublin, Ireland, Springer, (2016), pp. 342-347.

Iqbal, S. T. et al., "Oasis: A Framework for Linking Notification Delivery to the Perceptual Structure of Goal-Directed Tasks," ACM Transactions on Computer-Human Interaction (TOCHI), Champaign, IL, vol. 17, No. 4, (2010), 28 pages.

Janssen, M. J. et al., "Memory for time: How people date events," Memory & Cognition, Psychonomic Society, Inc. vol. 34, No. 1, pp. 138-147, (2006), 10 pgs.

Linden, G. et al., "Amazon.Com Recommendations: Item-to-Item Collaborative Filtering," IEEE Internet Computing, No. 1, (2003), pp. 76-80.

Paulheim, H., "Knowledge Graph Refinement: A Survey of Approaches and Evaluation Methods," Semantic Web, IOS Press, Mannheim, Germany, vol. 8, No. 3, (2017), pp. 489-508.

Pfautz, S. L. et al., "A General Context-Aware Framework for Improved Human-System Interactions," AI Magazine, Association for the Advancement of Artificial Intelligence, vol. 36, No. 2, (2015), pp. 42-49.

Radvansky, G. A. et al., "Event boundaries in memory and cognition," Current Opinion in Behavioral Sciences, vol. 17, (2017), pp. 133-140.

Rodriguez, M. A., et al., "Constructions from Dots and Lines," Bulletin of the American Society for Information Science and Technology, vol. 36, No. 6, (2010), pp. 35-41.

Sarwar, B. M. et al., "Item-Based Collaborative Filtering Recommendation Algorithms", WWW10, GroupLens Research Group/Army HPC Research Center, Minneapolis, MN, May 1-5, 2001, vol. 1, (2001), pp. 285-295.

Singhal, A., "Introducing the Knowledge Graph: things, not strings," web page, Retrieved on Dec. 29, 2020. https://blog.google/products/searcintroducing-knowledge-graph-things-not, published May 16, 2012, vol. 5, (2012), 7 pgs.

Zacks, J. M. et al., "Event Structure in Perception and Conception," Psychological Bulletin, Event Structure 1, vol. 127, No. 1, (2001), 79 pgs.

Zheng, Y. et al., "A Neural Autoregressive Approach to Collaborative Filtering", Proceedings of the 33rd International Conference on Machine Learning, New York, NY, arXiv preprint arXiv:1605.09477, (2016), 10 pgs.

\* cited by examiner

| | |
|---|---|
| g.withSack(0.0f).V({vertexID}) | Starting with a start vertex |
| .repeat( | |
| bothE({relevantEdgeTypes}) | Find pairs of vertices connected by a known edge type |
| .sack(sum,'utility') | Calculate the connection strength of the edge, more is better |
| .bothV() | |
| .sack(sum,'utility') | Calculate the similarity of the vertices, more is better |
| .dedup()) | Remove edges or vertices that show up more than once |
| .emit().times({depth}) | Re-run the process above for the next step out in the graph until we reach a threshold depth |
| .has('_entitiesOfSchema', within({relevantNodeTypes})).as('end') | Filter results to include vertices with supported recommendations |
| .sack().as('cost').order().select('end') | Return vertices, sorted by relevance |

FIG. 9B

CONTEXTUALIZED HUMAN MACHINE SYSTEMS AND METHODS OF USE

CROSS-REFERENCE TO RELATED APPLICATIONS

This application claims the benefit of U.S. App. No. 62/985,123, filed on Mar. 4, 2020, entitled "CONTEXTUALIZED HUMAN MACHINE INTERFACE", the entire contents of which is incorporated herein by reference.

STATEMENT REGARDING FEDERALLY SPONSORED RESEARCH OR DEVELOPMENT

This invention was made with Government support under Contract No. FA8650-18-C-6869 awarded by the U.S. Air Force. The Government has certain rights in the invention.

REFERENCE TO SEQUENCE LISTING, A TABLE, OR A COMPUTER PROGRAM LISTING COMPACT DISC APPENDIX

Not Applicable.

BACKGROUND OF THE INVENTION

1. Field

This disclosure relates to human-machine teams, in particular, a system for providing contextualized automation and augmentation assistance to a user of a processor-based data analysis system/machine.

2. Background

Data analysts from many fields have an increased need to access and analyze large volumes of disparate data containing in a timely and efficient manner. This data may be text data, visual data, video data, prior work products, work products of others and mission/task data. As a result of this volume of data, and the increasing speed it needs to be analyzed at, there remains an urgent need to redesign tools to balance automation and human-in-the-loop expertise for collaborative and interactive data analysis.

BRIEF SUMMARY OF THE INVENTION

The following summary is included only to introduce some concepts discussed in the Detailed Description below. This summary is not comprehensive and is not intended to delineate the scope of protectable subject matter, which is set forth by the claims presented at the end.

Data analysts within several communities, such as the Intelligence, Surveillance, and Reconnaissance (ISR) community, have a challenging role that requires the ability to navigate and interpret large amounts of data across many disparate sources to produce actionable analyses during a data analysis phase defined as processing, exploitation, and dissemination (PED). Analysts frequently encounter a problem of information management, from challenges associated with maintaining situational awareness and contextual knowledge, to retrieving, processing, and utilizing sensor data in a timely manner once collected. The objective of contextualized human machine systems is to design and develop context-aware multimodal human-machine interfaces for data analysts—to improve information management and interaction between analysts and the technologies they use.

The disclosed contextualized human machine system combines advanced naturalistic interactions with context reasoning to enable analysts to more efficiently produce intelligence products that are tailored to needs of their supported unit. The interactions are designed to take advantage of cognitive principles and recent advances in interaction technology to improve how analysts are supported across all aspects of PED. The context reasoning processes computational representations of context (including mission data, related intelligence, and user interactions) to proactively support the analyst with partially automated product generation and recommendations of relevant information. This enables analysts to more effectively process an ever-increasing amount of data. Contextualized human machine systems quantify and maintain links between data from processing to dissemination. Unlike current static work products, work products generated with contextualized human machine systems may be dynamic and interactive, enabling work product consumers to quickly access the information they need, when they need it. The dynamic nature of these products means that additional contextual information is available on-demand.

In one embodiment, a contextualized human machine system is provided comprising: a context platform configured to receive an input data; the context platform configured to define, from the input data, a first property value of a first node corresponding to a multi-layer knowledge graph; the context platform configured to define a second property value of a second node of the multi-layer knowledge graph; the first node and the second node comprising a node pairing; the context platform defining a relationship property value of a relationship type between the first node and the second node; and a recommendation engine configured to execute a recommendation algorithm to automatically determine a context-aware recommendation of a third node based on a connection strength measure and a similarity measure.

In some embodiments, the recommendation algorithm comprises a graph traversal algorithm configured to: (a) identify one or more additional node pairing of the first node connected by any relationship type to another node in a graph layer of the multi-layered knowledge graph; (b) calculate a connection strength measure of the relationship type for each node pairing and associate the connection strength measure to each of the nodes in the node pairing; (c) calculate a similarity measure of the nodes in each node pairing and associate the similarity measure to each of the nodes in the node pairing; (d) iterate steps (a)-(c) for a next step out of the graph layer for subsequent node pairs of nodes connected by any relationships type until a threshold traversal depth of steps; (e) define each of the nodes in the each of the node pairings and the subsequent node pairings as a plurality of related nodes; (f) filter the plurality of related nodes to define a plurality of filtered nodes as a plurality of potential recommendations; (g) determine a weighted value of each of the plurality of filtered nodes as a function of the connection strength measure and the similarity measure; and (h) select the filtered activity node with the greatest weighted value as the context-aware recommendation.

In some embodiments, the first and the second node are selected from the group consisting of an activity node, a content node, an actor node and mission node.

In some embodiments, the input data comprises a chat message. In some embodiments, the input data comprises a representation of a user activity with a user interface.

In some embodiments, the first and the second node are selected from the group consisting of an activity node, a content node, an actor node and mission node.

In some embodiments, the contextualized human machine system further comprises a synonymy layer configured to translate the input data to match the first property value and the second property value as defined by a pre-defined domain model.

In some embodiments, a processor-based method of automatically determining a context-aware recommendation to a user of a human-machine system is provided, the method comprising: receiving an input data; defining, from the input data, an activity property value of an activity node corresponding to a multi-layer knowledge graph; defining a content property value of a content node of the multi-layer knowledge graph; defining a relationship property value of a relationship type between the content node and the activity node; and executing a recommendation algorithm to automatically determine a context-aware recommendation for a second activity node or a second content node based on a connection strength measure and a similarity measure.

Other objects, features, and advantages of the techniques disclosed in this specification will become more apparent from the following detailed description of embodiments in conjunction with the accompanying drawings.

BRIEF DESCRIPTION OF THE SEVERAL VIEWS OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 9B shows an example embodiment of the recommendation algorithm in pseudo-code.

DETAILED DESCRIPTION OF THE INVENTION

Figure 1:
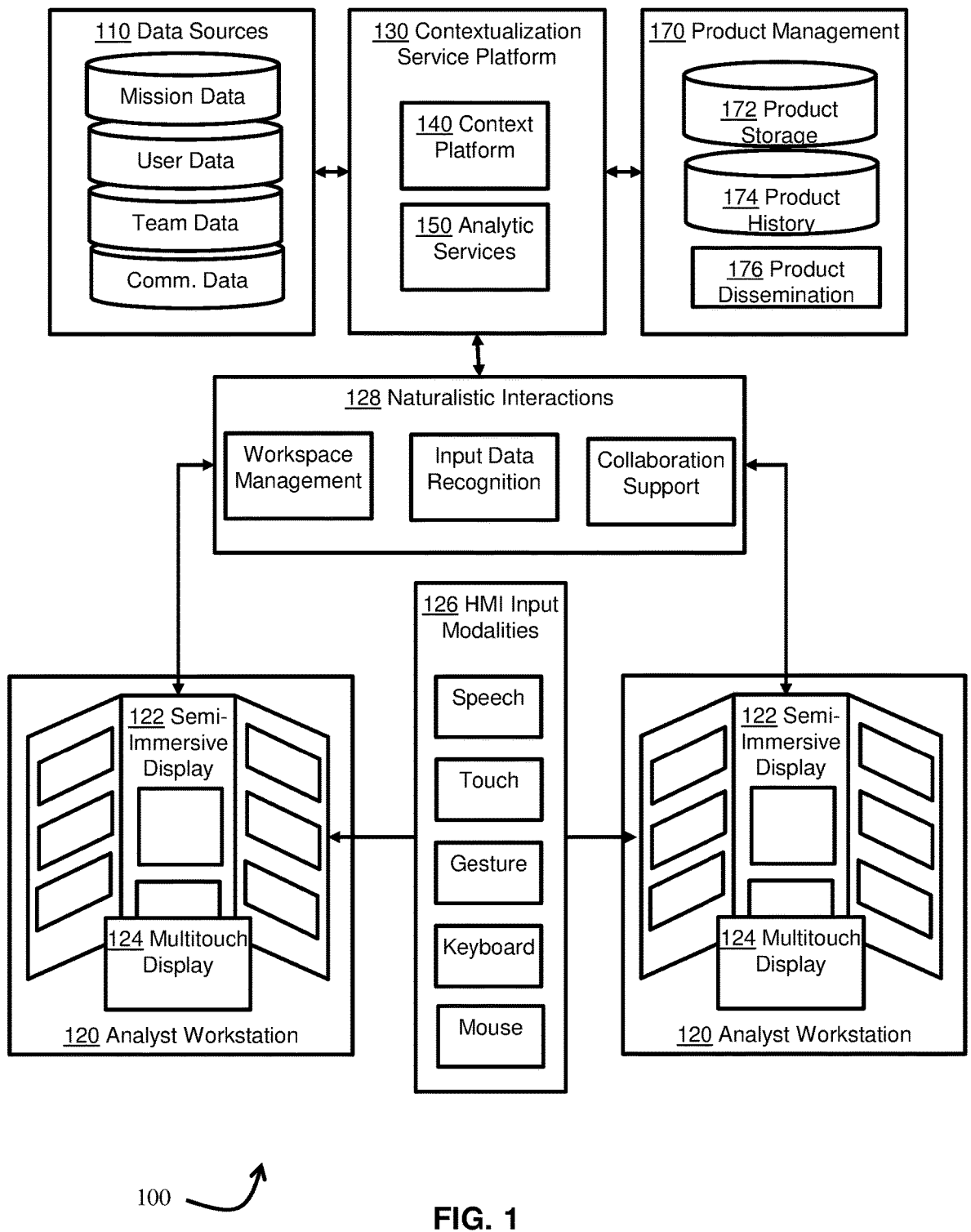
FIG. 1 shows a functional overview diagram illustrating the general composition of one example embodiment of a Contextualized Human Machine System.

COPYRIGHT NOTICE: A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. The following notice applies to any software and data as described below and in the drawings hereto: Copyright @ Aptima, Inc., 2020-2021, All Rights Reserved.

The following is a glossary of acronyms and abbreviations used in this disclosure:
FMV Full-Motion Video
HMI Human-Machine Interface
ISR Intelligence Surveillance and Reconnaissance
NLP Natural Language Processing
PED Processing, Exploitation, and Dissemination
SIGINT Signals Intelligence
STEP Speech to Text for Enhanced PED Contextualized human machine systems and methods of use will now be described in detail with reference to the accompanying drawings. It will be appreciated that, while the following description focuses on a system that provides assistance to intelligence analysts, the systems and methods disclosed herein have wide applicability. For example, the systems and methods described herein may be readily employed with analysts of data for financial, law enforcement, security, weather, logistics, monitoring and educational applications. Notwithstanding the specific example embodiments set forth below, all such variations and modifications that would be envisioned by one of ordinary skill in the art are intended to fall within the scope of this disclosure.

As used herein, the term "module" refers to hardware and/or software implementing entities and does not include a human being. The operations performed by the "module" are operations performed by the respective hardware and/or software implementations, e.g. operations that transform data representative of real things from one state to another state, and these operations do not include mental operations performed by a human being.

The term "sensor data", as used herein is a broad term and is to be given its ordinary and customary meaning to a person of ordinary skill in the art (and are not to be limited to a special or customized meaning), and furthermore refers without limitation to any data associated with a sensor, such as a continuous analyte sensor.

The term "analyst", as used herein is a broad term and is to be given its ordinary and customary meaning to a person of ordinary skill in the art, and furthermore refers without limitation to an entity performing the function of reviewing and creating data from data sources such as financial, law enforcement, security, weather, logistics, monitoring and educational data.

Technical Problem

Data analysts, such as those within the Intelligence, Surveillance, and Reconnaissance (ISR) community, have a challenging role that requires the ability to navigate and interpret mounds of data across many disparate sources to produce actionable decisions during a work phase known as processing, exploitation, and dissemination (PED). Further compounding this challenge is the ever-changing need to incorporate new advanced analysis capabilities into the day-to-day operations of the analyst, such as the increased use of remote sensors, the ability to stream imagery at unprecedented rates and resolution—including high-definition full motion video (FMV)—and the ability to collaborate virtually within and across teams and organizations. While the sources of data have increased, the pace of the analysis has shifted toward one that often requires direct, near-real-time mission support to facilitate timely decisions. This situation is common to other users of processor-based machines, in human-machine teams, that have to analyze large volumes of disparate information to produce actionable decisions in a short amount time.

Given these mission demands, the operational challenge presented cannot be solved by simply increasing manpower or by presenting more sensor data to analysts or operators. On the contrary, analysts are more frequently encountering a problem of information management, ranging from the coordination challenges associated with maintaining situational awareness and contextual knowledge while exploiting across sensor types to identify potential targets, to retrieving, processing, and utilizing sensor data in a timely manner once collected. Although this is a common problem, an off-the-shelf solution will not address the specific needs of PED analysts. New tools and information displays continue to increase the complexity of the analyst's workspace without established human-machine interface or interaction guidelines for sustained usability and naturalistic system interaction.

To provide interface support tools to address this operational challenge, additional interface tools are used to improve operations: multimodal interactions, product support tools and collaboration tools.

To provide decision-support tools in support of this operational challenge, two classes of changes were identified to improve analyst's operations: (1) automations, which use context-aware computing methods to automate the creation of a product given some trigger, and (2) augmentations, which provide assistive support to the analyst using a combination of multimodal interactions and context-aware computing methods. To provide this automation and augmentation, the machine should be able to understand the information needs of the analyst, which is to say, map the available content onto an analytical structure, quantitatively assess the relevance of the content given that mapping, and present relevant, context-aware content to the human without overloading them. However, with this goal of helping analysts with context-aware tools to automate and augment the user, a technical problem arises with how do you architect a solution that will allow the machine to efficiently select which automations or augmentations are provided to the user in a highly-dynamic work environments. This problem extends at least to defining the system inputs to reflect the multi-modal environment and defining intermediate data products to define, analyze and determine the most appropriate automation and augmentation, This problem is analogous to challenges faced by Netflix and others that attempt to automatically present service users with content related to past content they've consumed. These solutions typically leverage collaborative filtering to predict relevance. However, while solutions such as collaborative filtering are used because they've been proven reliable and scalable, the static preference assumption in these methods negates its applicability in highly dynamic work environments. In many environments, analyst's needs change from moment to moment in response to myriad factors, such as the information in the content they are examining, the activity they are performing, the mission they are assigned, or other requirements of their customer. This is particularly true when the sources of data and the products from the data are spread across multi-modal interfaces and work products that change over time.

Given these technical challenges, an improved contextualized human machine system is provided that efficiently ingests and contextualizes data from a broad range of human-machine interface/interaction (HMI) tools to provide context-aware assistive support to analysts.

Technical Solution

To address these operational challenges of providing interface and decision support tools, an innovative and engaging human-machine interface/interaction (HMI) framework and system that takes advantage of emerging ubiquitous interaction technologies is provided. This framework and system defines context and a related domain model to fit a multi-layer knowledge graph that can automatically utilize input from these multiple modes of user interaction to quantitatively determine recommendations of assistive support to analysts.

To address the technical challenges related to interface support, an innovative and engaging human-machine interface/interaction (HMI) framework is provided. The benefits of multimodal interaction include an improved ability to timeshare information processing, as well as the natural human tendency to behave and perform work with multiple sensory channels, therefore augmenting cognitive bandwidth. Multimodal interaction in operational environments and missions through speech recognition, gesture recognition, and even multi-touch displays are now at the level of reliability and affordability to be introduced within a common workspace. However, each individual mode of input has generally been used in isolation, and there are unresolved (and likely, unexplored) technical challenges with combining them, such as how to ensure the set of technologies can co-exist seamlessly. This situation presents a significant challenge of determining how to integrate these technologies into a seamless user experience—one that blends together naturally and effortlessly—to provide operational impact to analysts.

To address the technical problems encountered in providing decision-support tools, the disclosed contextualized human machine system defines a system architecture that is able to ingest and contextualize data from a broad range of human-machine interface/interaction (HMI) tools to provide context-aware assistive support to analysts. The disclosed solutions rely on modeling and quantifying the feature space of activity, as opposed to only content, to enable finding, delivering, and characterizing content that is relevant to their work. In particular, services are provided that are based on representing contextually significant data as inter-related knowledge graphs according to a pre-defined domain model. By representing these factors as inter-related knowledge graphs, multiple types of pattern recognition and graph traversal methods may be used on the graph data.

As part of this solution, context is defined in a manner that takes advantage of the input provided by the HMI inputs and allows for use by system modules. In the disclosed embodiments, context has been defined as information about the actors, content, mission, and activity associated with the system that may impact interpretation or decisions. With this definition, these four attributes are then treated as layers in a knowledge graph that can be analyzed using a variety of techniques. This graph-based context model can be dynamically populated by parsing HMI data used and generated within the contextualized human machine system according to a pre-defined domain model. And for system data that cannot be easily parsed with common NLP technologies, additional tools such as a synonymy layer may be used to translate HMI data into domain model consistent language that can be understood by common NLP technologies.

With this use of multi-modal input, the definition of a domain model and a definition of context, the contextualized human machine system are able to (1) ingest multi-modal HMI data from the system based on user activity, (2) automatically determine, based on the analyst's activity, relevant contextual information related to that data, and (3) make inferences to provide context-based decision support services such as automating certain tasks or making task recommendations to the analysts.

Practical Application

Generally, contextualized human machine systems leverage naturalistic human-machine interactions and assistive context-aware reasoning capabilities to improve analyst efficiency in the increasingly complex information landscape.

The disclosed contextualized human machine systems, and its definition of context in a manner that allows for automated creation and analysis of contextual data, can be applied to many fields where users are confronted with multiple data sources as they attempt to create additional data products. These fields can benefit from context-based decision support services that can automate and/or augment the user as they do their work.

In particular, the contextualized human machine systems can be used to provide advanced multimodal human-machine interface/interaction (HMI) for data analysts by creating efficiencies while reducing manpower requirements to support a wide range of analysis missions. This system provides advanced interfaces for PED analysts to efficiently create high-quality products that are tailored to the needs and mission of the supported unit. contextualized human machine systems provide a platform for naturally and seamlessly interacting with and sharing information across multiple users/analysts for multi-modal PED and optimized for use within data-rich workspaces. The systems may particularly be helpful when integrated across distributed monitoring or command and control systems. The systems bring together these innovative technologies and methods to support and augment human analysts to improve efficiency and create higher quality products. The systems accomplish this by reducing cognitive load, reducing the time and effort it takes to navigate between tasks, and enabling new forms of interactive products.

When implemented, analysts are able to more efficiently create better products through the combination of naturalistic multimodal user interfaces supported by context-aware reasoning. Naturalistic multimodal user interfaces provide intuitive interactions, based on cognitive principles, to address human attention and processing limitations. Context-aware reasoning proactively supports analysts by anticipating their needs and more intelligently interprets their actions to resolve multimodal ambiguity.

As referred to above, efficiency is the cost required to produce a given intelligence product for the customer. Contextualized human machine systems seek to optimize efficiency by using automation to reduce the time it takes for a human analyst—typically the costliest component of the system—to create and deliver a product to the customer. For example, efficiency can be measured as the average time to complete a given type of product, and the average number of user actions required to create the products.

When implemented in the PED environment, analysts are able to create products that are more responsive to the supported unit through the creation of flexible and dynamic interactive products and maintaining links between data from proceeding to dissemination. The interactive products created in contextualized human machine systems will address limitations of current static products (e.g., the inability to track reasoning or see linked information in context), enabling the supported unit to receive the information they need when they need it. The dynamic nature of these products means that additional contextual information will be available on-demand to the units.

As referred to above, responsiveness is the number of high-quality products delivered to the customer in a given amount of time. Contextualized human machine systems seek to optimize responsiveness by using automation to assemble, in part or in whole, intelligence products given the context provided by the raw data and the insights of analysts (i.e., the annotations captured in chat). For example, responsiveness can be measured as the coverage of products that can be created with contextualized human machine systems compared to the products analysts are required to produce, and the level of automated support associated with creating each of these products.

One Example Embodiment of the Contextualized Human Machine System:

Contextualized human machine systems leverage naturalistic human-machine interactions and assistive context-aware reasoning capabilities to improve analyst efficiency in the increasingly complex information landscape. These systems provide contextual cues to combat the problems encountered when analysts act on mounds of data to produce actionable decisions. These systems may also provide contextual recommendations for common analysis tasks to help the analyst be more efficient in their workflow.

For illustration purposes and not for limitation, one example embodiment of the contextualized human machine system is shown in FIG. 1. As shown in FIG. 1, the contextualized human machine system 100 comprises one or more analyst workstations 120, contextualization service platform 130, data sources 110 and work products related to product management 170. Generally, the analysts perform tasks on the input data provided by the data sources 110 to create work products. The analysts may also reuse previous work products or work products of others. In performing their tasks, the user also usually interacts with others through services such as digital messaging. The contextualization service platform 130 ingests the activity of the user and acts as an assistant to provide augmentation or automation services based on that activity.

The analyst workstation 120 may allow for user interaction through multiple human machine interface modalities 126 such as speech, touch, gesture, keyboard or mouse. With the contextualization service platform 130 being in communication with the analyst workstation 120, the system is able to monitor and parse the user's naturalistic interactions 128 to recognize data input for use by the context platform and provide collaboration support tools.

The data sources 110 generally comprise pre-defined data such as mission data, user data, team data and data from the analyst's interaction with the analyst workstation.

The work products of product management 170 generally comprise result of an analyst combining data from different sources to create meaningful and actionable new data.

The contextualization service platform generally pull types of data a pre-defined by a domain model to populate a database of contextual data. The database of contextual data is primarily a multi-layered graph of quantified nodes and edges. The contextualization services platform is also able to analyze the contextual data to determine other relevant data that may be of some assistance to the system user.

Figure 2A:
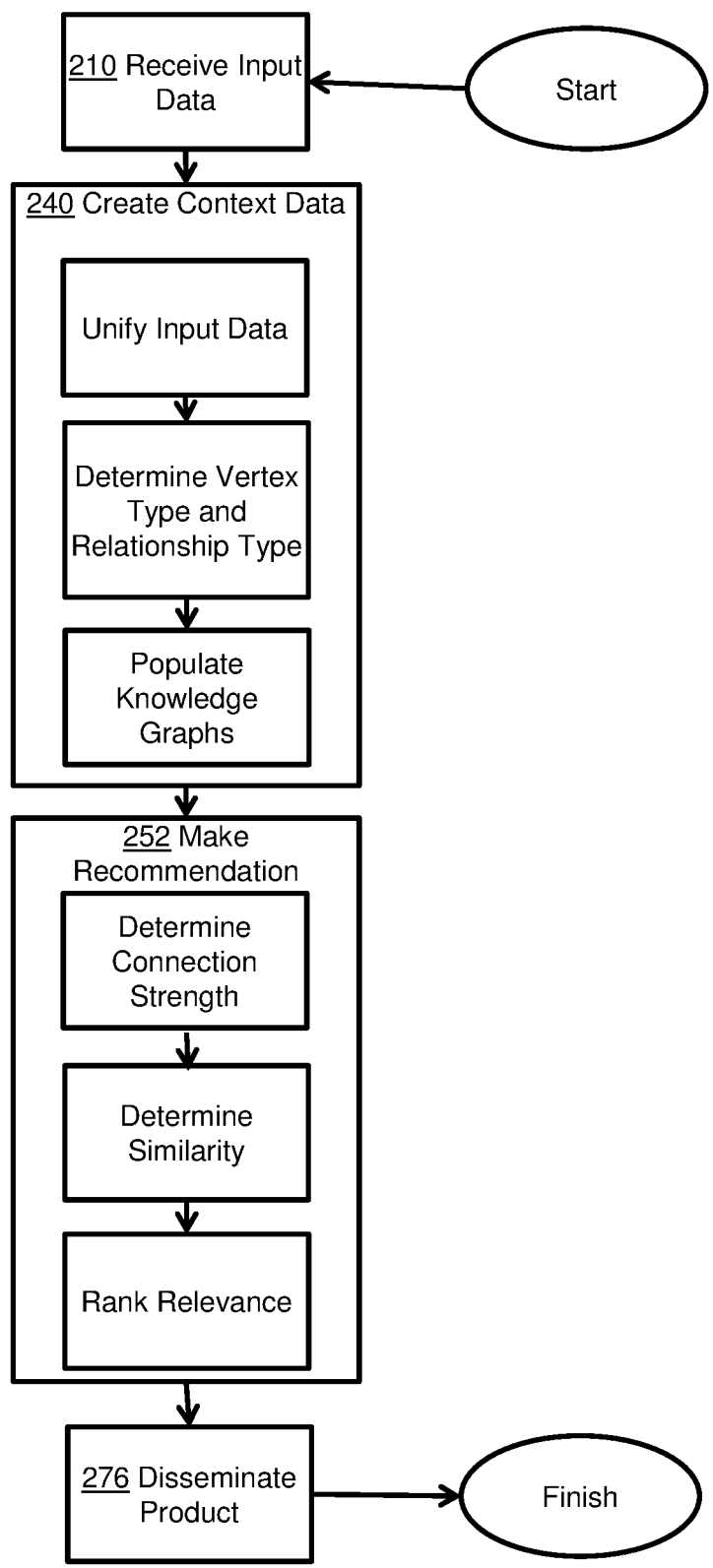
FIG. 2A shows a process diagram illustrating one example embodiment methods of using the Contextualized Human Machine System.

Generally, these systems perform the functions shown in FIG. 2A. Disparate input data is received, context data is created and recommendations for assistance to the user are determined. It is significant that context is determined by unifying the input data so that it can be used by a context platform to populate a multi-layer knowledge graph that represents context and contextual data. With context determined, recommendations are made by determining connections and similarities with other contextual data and then making specific automation or augmentation recommendations. In most embodiments, the activities performed by the user result in a work product that is then disseminated.

Application to Operational Environment

The PED process represents the transformation of raw collected data into usable information distributed for further analysis and/or use as combat information by commanders and staff. The primary function of the PED line is to create early-phase intelligence products, which provide the basis from which more predictive and summative products are derived. This task list includes categories for mission preparation, mission set up, feed exploitation, communication with customer, product creation, target research, quality control, and dissemination. With the existing requirements for specific PED crew roles, multimodal interactions and product support, collaboration tools, and context-aware reasoning were identified to alter existing workflows to improve PED operations. In particular, two classes of changes were identified to improve operations: automations, which use context-aware computing methods to automate the creation of a product given some trigger, and augmentations, which provide assistive support to the analyst using a combination of multimodal interactions and context-aware computing methods.

An example of the automation class is the creation of a still. Stills can be requested dynamically during mission execution. Requests come in through chat messages, with a representative from the customer organization saying something to the effect of "grab a still of that." This phrase, and similar permutations, can be used to trigger an automated still creation process. This process uses the chat message's timestamp as the end-point of a fixed-width temporal window, extracts a video clip for that window, selects the video frame at the middle of the window as the still, and populates a product with that still from a template. The new product is then pushed into the quality control queue for review prior to dissemination. From this example of automation, the following features for a contextualized human machine system are provided:

The system may monitor chat traffic in mission-relevant rooms.

The system may recognize a series of keywords and phrases that capture semantically meaningful events in the chat.

The system may trigger automated processes when it identifies a key phrase.

The system may use a rules-based system to extract video clips from the stream.

The system may extract individual frames from the video stream.

The system may link individual frames to their source video.

The system may track a set of templates associated with various products.

The system may instantiate a product from a template.

The system may insert a frame of video into a product.

The system may push a product into a quality control queue.

The system may support manual adjustment of products during quality control.

An example of the augmentation class is the creation of a dynamic stop intelligence products (DSIP). DSIPs are detailed, hierarchical products comprising an overview of the route and per-stop details, typically delivered as slides. The process for creating these products is manually intensive, creating and assembling multiple stills into a cohesive narrative. Since final delivery is not expected until the end of the mission, automation is not required in such a way that the human would be removed from the loop. Analysts using contextualized human machine systems should be able to simply and efficiently create DSIPs using natural interactions. For example, we assume that the analyst can see (1) the flight path of their platform, (2) the view window of their platform on the ground, and (3) the vehicle tracks extracted from the FMV using computer vision techniques. The analyst is able to initiate the creation of a DSIP, which effectively creates a label in some standard format that contains the target name, the date, and a unique identifier for the product. This label can be applied to constituent components of the DSIP. As the mission unfolds, the analyst calls out vehicle stops for the target tracked in the DSIP, which triggers the automatic creation of still products that are numbered, tagged with the DSIP, and geo-rectified on their screen. Once the follow has ended, the analyst can go back through each still, edit it to focus on the optimal frame for the consumer, and annotate the chosen still to convey the relevant information for the customer. From this example, in addition to the automation requirements above, the following features may be provided:

The system may generate labels to identify products.

The system may infer the labels that should be applied to a product.

The system may support the annotation of a still.

The system may export an overview of the mission for use in products.

The system may export linked products in a cohesive format.

Both of these improvements, automation and augmentation, benefit from context-based decision support methods. To implement these improvements, one guiding principle of context-based decision support methods is to help maintain the real-time, dynamic context of the human operator and their interactions with the system. One view of context awareness refers to the ability of users to maintain a sense of the relation between what they are viewing and other parts of the environment (e.g., the current view with respect to the whole situation). Loss of context awareness typically occurs after extensive periods of observation of a subset of the information landscape, when relevant connections between data fade from a user's mental model. One approach to help foster context awareness is coordinated, linked visualization interfaces that model connections in the data and provide visual feedback mechanisms to illustrate how and when interactions with that data lead to changes in the display. Another approach to help foster context awareness is the development of recommendation systems that leverage large-scale knowledge bases, here knowledge graphs, to model and reason over the content in a system and alert the user (either on-demand or automatically) to data that might be relevant to their interests. Examples of recommendation systems include those used by Netflix, Amazon, and Hulu. These services use recommendation systems to make it easier for users to find content that may interest them by identifying a subset of relevant content from a large library (e.g., movies, products, television episodes).

Coordinated visualization and recommendation engines are complementary approaches that can assist intelligence analysts. Coordinated visualization provides a framework for designing interfaces and interactions that allow analysts to dive deep into their data; as they move from observation, to capture, to annotation, to linking, coordinated interfaces provide a trail of breadcrumbs to help analysts remember the path they took to get to their current analytical state, and a mechanism for moving quickly and efficiently back to a broader task. Recommendation engines can provide cognitive assistance to the user during these processes. In the classical example, the recommendation engine automatically suggests relevant content based on a search or query. Using adaptive user interface techniques, contextualized human machine systems can enhance the classical recommendation engine approach by automatically managing and updating the query based on what the analyst is currently viewing and their viewing history.

Defining and Modeling Context

To provide these additional tools to improve operations, specifically to provide context-based decision support methods, a definition of context is needed that allows the system to provide the automation and augmentation services. Context awareness refers to the ability of users to maintain a sense of the relation between what they are viewing and other parts of the image/FMV (i.e., the current view with respect to the whole image, especially given different fields of view, resolution, etc.). For embodiments of contextualized human machine systems, context was defined as the explicit and implicit situational information about the actors, content, mission, and activity associated with a system that may impact interpretation or decisions. With this definition of context, these four attributes can be modeled as layers in a graph—expanding upon the traditional, content centric definition of a knowledge graph—that can be analyzed using a variety of techniques.

Figure 2B:
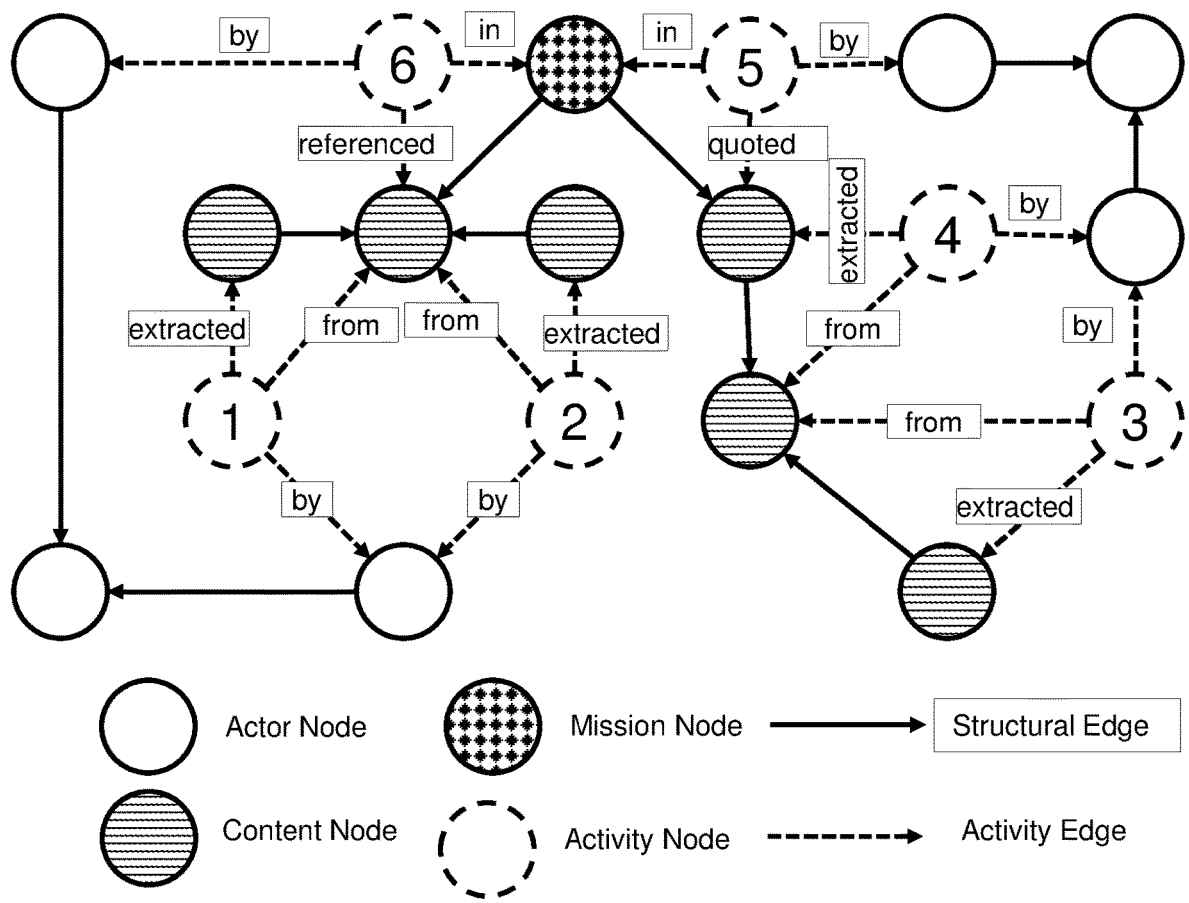
FIG. 2B illustrates components of context represented as interrelated, multi-layered graphs.

Referring to FIG. 2B and the system's definition of context, actors, content, mission and activity are modeled as nodes of multi-layered graphs. In embodiments of the disclosed activity-centric systems, activity is modeled explicitly as nodes within the graph. Each node represents an action that is performed by an actor and, optionally, operates over content to achieve a mission objective. This definition allows us to simplify and enhance a domain modeling approach to four layers:

The actor layer is comprised of a two node types, the actor node, which represents discrete human or machine entities within the system, and the group node, which represent related collections of human or machine actors.

The content layer is a heterogeneous layer representing the data over which actors operate. It is equivalent, in many regards, to the traditional form of a knowledge graph, linking discrete source data nodes together through myriad extracted nodes derived from automated analytical methods or explicitly created from actor interactions with the system.

The mission layer is a heterogeneous layer that represents the goals, objectives, tasks, requirements, constraints, products, and the relationships there-between, that define the workflow. The relationships between these entities are typically defined by the domain, policy, or best practices of the organization. One common example would be TaskN having a Create relationship to ProductQ.

The activity layer is a homogenous collection of the semantic activity nodes described above. The core of each activity node is the action, start time, and end time attributes, stored as properties on the node. Additional properties can be stored depending on the domain needs. The semantics of that action are modeled as four types of relationships: inputs, outputs, actors, and mission. Inputs and outputs model the semantic of content transformation within the work process, which can be extracting or aggregating data into relevant information. Actor and mission relationships capture the semantics for who is performing the necessary work. An activity node must always have an actor and a mission relationship. Input and output relationships are not required unless the action mutates content.

In this layered model, the activity layer acts as a connective tissue to fuse the knowledge graphs, allowing for use case-specific implementation of the actor, content, and mission layers in the system. FIG. 2B illustrates the approach for an information analysis use case. Activity is represented by discrete activity nodes in the graph, with edges pointing the associated actor (actor node), mission (mission node), and/or content (note) entities. Activities 1, 2, 3, and 4 represent content extraction by an actor. They use "by" relationships to denote the actor, "from" relationships to identify the source content, and "extracted" relationships to identify the newly created content. Activities 5 and 6 represent the actions of "referencing" and "quoting" content in a product. They use "by" relationships to denote the actor, "in" relationships to denote the product, and relationships with semantically meaningful labels ("referenced" and "quoted") to denote the specific type of action that was taken. The results of these activities are represented as new relationships (solid arrow) in the graph that link the associated actors, content, and/or mission elements to each other directly using a separate set of semantic layers, such as provenance or structure. One advantage of this multi-layered graph approach is that it enables multiple types of pattern recognition in the graph using different graph traversals. These differences can be leveraged independently or jointly by analytics, enabling several assessments of the data space.

Data for the activity nodes is captured by monitoring and logging the activity of the analyst. Activity logging is a well-documented practice in both academic and commercial realms. Traditional approaches model system-level events, such as mouse clicks, keystrokes, and/or window focus changes, then use post-hoc analyses to derive insights. These traditional methods have shortcomings as they require significant additional information to imbue the system events with process semantics and are not well-suited to dynamic task changes. Instead, the disclosed systems capture and represent activity semantics explicitly, by translating system-level events into semantic events imbued with the requisite data from an activity modeling approach within the user interface. Data representing activity semantics may comprise any set of data sufficient to populate the node and represent the activity. In one embodiment, a minimum tuple that must be captured is defined as (actor; target; action), where target can be an entity in the mission or content layers. This tuple is appropriate when the actor is mutating a property of an element, such as rating the credibility of the information contained in a snippet of text. In some embodiments, more complex activity may also include an output. In this case, the tuple would be adjusted to be (actor; source; output; action). Limits on the tuples that are captured are not required and it is recommend that the system capture as much detail as possible. It is significant to label the actions of the activity nodes in a semantically meaningful way. Looking again at FIG. 2B, the activity nodes that capture the creation of derivative knowledge elements use from and extracted relationships to denote the source and the output. The precise semantics of these relationships and analytics thereover will change with the operational domain, use case, etc.

Domain Model

In order to automatically adapt an interface and make recommendations to improve analyst efficiency, it is necessary to identify which elements of the task and user context are both relevant and available to be automatically or semi-automatically identified by the system. As described herein, the general categories of context that may be considered include data about the user, data about the location and environment of the mission, data about the ongoing mission, and data about the user's interaction with the system.

Figure 6:
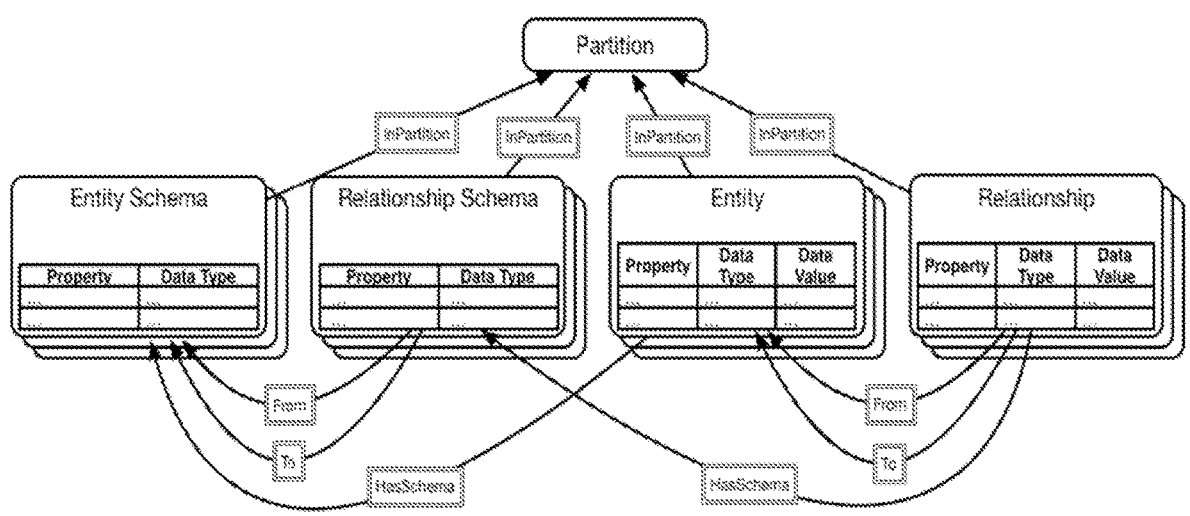
FIG. 6 illustrate an example domain model for the Contextualized Human Machine System.

These general categories of data are implemented in the context platform, according to a domain model. The context platform's domain model defines elements of context in five main elements: Partitions, Entity Schemas, Relationship Schemas, Entities, and Relationships. The relationships between these elements are shown in FIG. 6 and described below.

Partitions serve as namespaces for keeping graph data for different client applications (tenants in a multitenant architecture) separate from each other. All other main elements will be associated with a Partition through a graph edge and/or an indexed property key.

Entity Schemas serve as blueprints for the types of entities that can exist within the graph and are represented within the graph as vertices of label EntitySchema. The Entity Schema has a name which is used to label any Entity vertices associated with the schema and provides a specification for the names and data types of properties that entities of this schema can have. Entity Schemas with a given (partition name, entity schema name) combination will be unique within the graph.

Relationship Schemas serve as a blueprint for the types of relationships that can connect entities within the graph and are represented as vertices of label RelationshipSchema. The Relationship Schema has a name which is used as the label of Relationship edges within the graph and a set of property definitions like the Entity Schema above. In addition, it has From Schema and To Schema properties that define which Entity Schema entities the relationships of this Relationship Schema label can connect. Relationship Schemas with a given (partition name, relationship schema name, from entity schema, to entity schema) combination will be unique within the graph.

Entities are vertices within the graph of label Entity and are the primary data element the developer interacts with. They represent all things in the application domain. Entities are associated with an Entity Schema and can have a set of typed properties with names and values. While an Entity's properties are not restricted to the names and types defined within the corresponding Entity Schema, any properties attached to the entity not present within its schema will not be indexed within the graph. Entities with a given (partition name, entity schema name, entity name) combination will be unique within the graph.

Relationships are edges within the graph which connect Entity vertices and are labeled with their corresponding Relationship Schema name. Relationships can have a set of typed properties with names and values that follow the same convention as in Entities above. In addition, Relationships have Start Time and End Time properties that mark when the relationship is relevant. Relationships with a given (partition name, relationship schema name, relationship label, start time) combination will be unique within the graph.

The context platform utilizes the domain model to define data values of interest so that the system can capture the following data to create interconnected graphs of the data:
The users (e.g., role, experience, preferences).
The chat rooms and user membership in the chat rooms.
The messages flowing through the chat rooms.
The results of using Natural Language Processing (NLP) on the chat messages.
The information products being developed, as well as their contained annotations.
The final report with links to contained products (e.g., stills within a mission summary).
People and Place named entities extracted from the text of chat messages and the information products (e.g., people, places).
The video feed and related platform geolocation information/metadata (e.g., vehicle position, sensor angle).
Cross-cue data (e.g., SIGINT hit locations).

This domain model supports the following context-driven features:
Video Products may be automatically generated based on the contents of the chat streams based on a simple phrase-based rules system.
Links to related information may be provided to the user when authoring product annotations.
Product Annotation suggestions may be provided based on the linkages back to the entities being discussed in the chat stream that prompted the creation of the product.

Contextualized Human Machine System Details

For illustration purposes and not for limitation, one example embodiment of the contextualized human machine system is shown in FIG. 1. The contextualized human machine system generally comprises multiple data sources, an analyst workstation, a contextualization system platform, a store of product management resources and a message broker. Generally, the analysts perform tasks on the data to create work products. Because of the vast amounts of data available, the analysts may use data from previous work products, reuse previous work products. The user also usually interacts with others through services such as digital messaging. The contextualization service platform ingests the activity of the user and acts as an assistant to infer and provide augmentation or automation services based on that activity.

Data Sources

The sources of data input for the contextualized human machine system may comprise any type of data stored or communicated within the system. The data source may be prepopulated products or knowledge graphs of contextual data defining properties for actors, content, mission or activity. The data sources may also comprise data from the analyst's interaction with the analyst workstation. For example, input data may comprise chat traffic from mission-relevant chat rooms, a series of keywords and phrases that capture semantically meaningful events in the chat, an extracted video clip from the communication stream of the user, extract individual frames from a video stream or product templates associated with various work products. And in some embodiments, the data source may include templates associated with various work products.

As an operational example, analysts functioning in the FMV Analyst role rely primarily on two types of data, the raw imagery and video captured on the ISR platform, and the annotations of that raw data by the PED Cell analysts. The latter is the source of a significant amount of the contextual information used by the supported commander. And analysts functioning in the eyes-on FMV Analyst role may rely on speech data transmitted to the system, and the input data may comprise a speech to text translation of their call-outs are then transmitted into the chat system for dissemination to the crew.

Work Products

Work products are generally the result of an analyst combining data from different sources to create meaningful and actionable new data. The work product may be disseminated to customers and the work product may be stored for later reference or use for other work products. For the Contextualized Human Machine System, work products are considered as one type of content within the domain model and the system definition of context.

These work products are increasingly moving beyond static PowerPoint-based products and are becoming products that take advantage of the interactive possibilities enabled by current technology. An "interactive product" is a work product based on the same styles of interaction that are used on the multitouch display described above, but with a goal of enabling access across a range of devices, including traditional computers and mobile devices. One idea of the interactive product concept is to use forms of linked visualization to understand the data in context. For example, as a customer iterates through the still images in a mission summary product, the geospatial locations of those stills will be shown on a map, and timeline will show when that still was captured during the mission. The stills will have linked data, including chat messages from the mission that are relevant, or additional information about people and places in the products. Context reasoning helps to provide this additional information to the analyst during production, and an interactive product can maintain linkages between data and products from exploitation through dissemination.

Analyst Workstation Components

Figure 4:
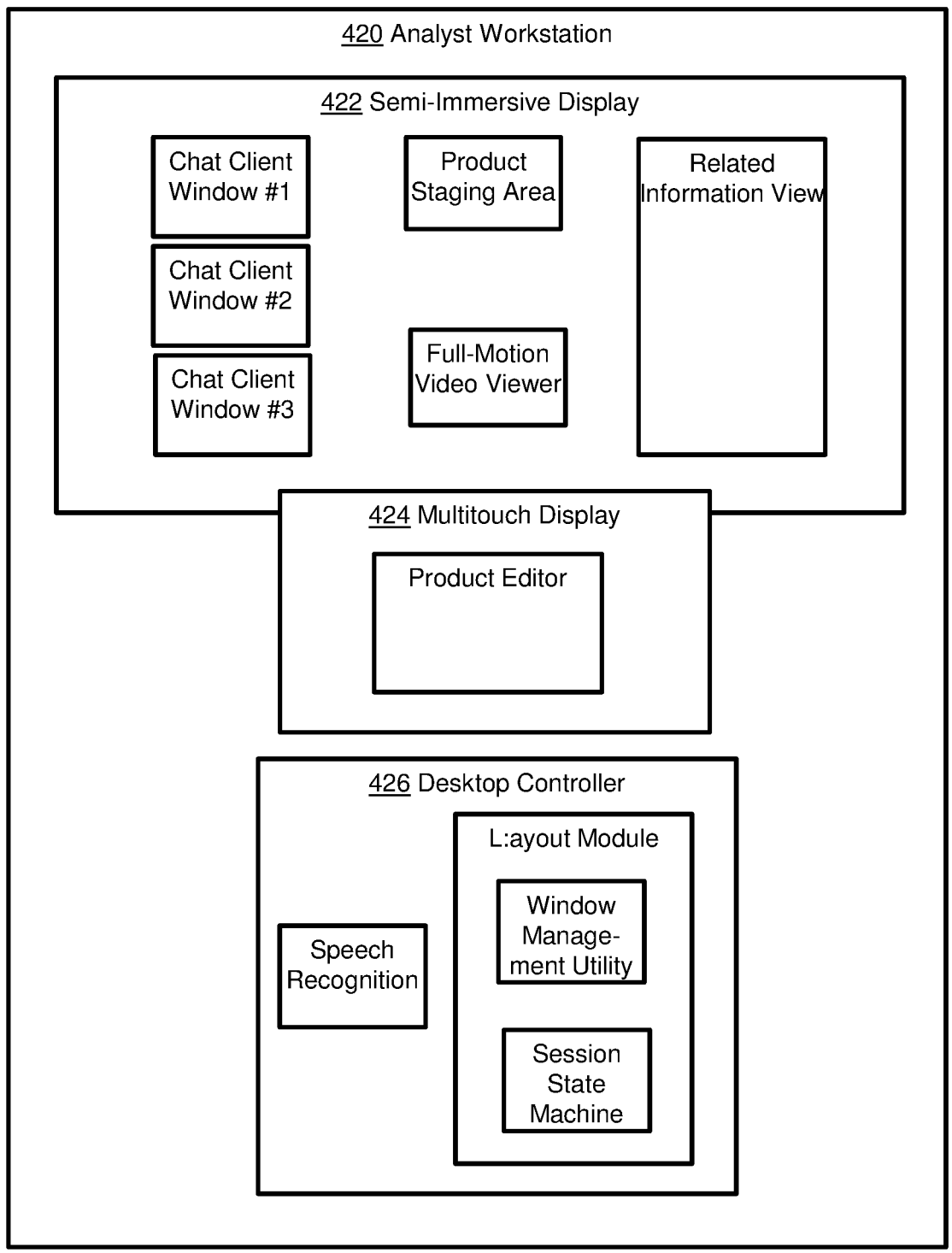
FIG. 4 shows a detailed view illustrating an example embodiment of the analyst workstation.

As shown in FIG. 4, the analyst workstation components generally comprise a semi-immersive display 422, a multi-touch display 424 and a desktop controller 426. The semi-immersive display 422 is used for two general categories of tasks. First, to observe and maintain awareness of the ongoing mission, through the display of elements such as chat windows and a live video stream. Second, to support the initial steps of analysis, by providing additional contextual information to guide interpretation of objects shown in video, and by allowing analysts to select or remove products that have been "staged" by the automated context reasoning algorithms. Selection or removal of products provides implicit feedback to the system regarding the relevance of the suggestions.

Below the semi-immersive display 422, the multitouch display 424 is used for precise product creation and management. Analysts can bring staged products down for editing through the use of a hand gesture, and then modify the product by adjusting the time shown and adding annotations on the image (e.g., labeling a person shown in the video). The process of labelling is supported by providing contextually-relevant suggestions, or the analyst can provide their own label. The products are shown on a map display, with the geospatial position of the product shown as a marker on the map, and on a timeline, with thumbnails shown at the bottom of the screen.

This design of the user interface for contextualized human machine systems follows three main principles:

Minimizing shifts of attention. Interfaces are configured so that there is minimal need for spatial movement of attention across the interface. Information on the user interface is placed in close spatial proximity to interfaces that are used for tasks where that information may be required. This will enable contextualized human machine systems to use an increased display area without overloading analysts.

Providing redundancy for interaction. The interface design for contextualized human machine systems provides redundant mechanisms that enable efficiency gains from multimodal interaction while remaining robust through the use of more deterministic interaction methods. Redundancy offsets some shortcomings of interface types. For example, speech recognition often falls far short of desired accuracy, and gesture recognition is prone to false positives. Redundancy of interaction also minimizes shifts in attention by enabling different forms of interaction based on the location of information in the interface.

Enabling support from analytics without over-reliance. The interfaces may be designed with the assumption that computational reasoning is imperfect. This approach is to offset a common pitfall of over-reliance on automation when it is applied to support human activities. Specific examples of these interface features are efficient interfaces for accepting or rejecting a recommendation made by the system, and interfaces for analysts to manually perform tasks that the automation may usually perform.

Generally, the user interface operationalize critical human factors constructs for optimized system performance and a more natural HMI experience. The analyst's user interface provided by a contextualized human machine system provides sustained immersion and a naturalistic experience by addressing: (a) attention management, achieved by leveraging multimodal cueing to maximize the human operator's ability to cognitively timeshare information processing; (b) cognitive shifting, achieved by minimizing the manual steps required to switch tasks (e.g., observing the sensor vs. creating a product) and establishing a contextual link from one task to the next (e.g., why is the operator shifting from one view to another); and (c) embodied cognition, or the perception of being "in the image." achieved by leveraging the principle of visual momentum and avoiding usability lapses that would break the analyst's sense of immersion.

Other suitable user interfaces for interaction in semi-immersive environments is to use multimodal user interfaces. Multimodal user interfaces is expected to provide a variety of benefits from mixing complementary input modalities, including the potential for increased efficiency and command disambiguation. For example, a voice command issued in combination with a gesture ("move" while pointing to a new location) coveys more information at once than either command would convey on its own. In addition, it would be ambiguous to issue either of these commands on its own. contextualized human machine systems may be configured to utilize multiple inputs such as touch, voice, and gestural inputs.

Referring to FIG. 4, the front-end components on the analyst's workstation are implemented primarily using web technologies to aid portability, reconfiguration, and reuse. The components on the semi-immersive display 422 (Chat Client, Product Staging Area, Video Feed, and Related Information) are built using the Electron framework. SystemEdit is a web application that is accessed through a web browser.

The chat client is meant to mimic the chat interfaces commonly used in operational PED environments. The workstation interface allows for multiple chat rooms to remain visible.

The product staging area is a client displaying product recommendations that have been generated by the analytics. Product recommendations take the form of a "staged product," which consists of a pre-selected set of information such as a frame of video, and an associated chat message that triggered the generation of the recommendation. In some embodiments, the SystemStage interface shows two product recommendations at a time, along with an indicator of how many additional product recommendations exist but are not currently shown. As examples of using multi-modal interfaces, the SystemStage interface may be motion activated. For example, to act on one of the product recommendations, analysts may use a hand gesture to select or eliminate the recommendation. When they point with their hand at one of the visible recommendations, the recommendation can be made to "pop" forward, along with text that floats above the recommendation that says "Delete" and text that floats below the recommendation that says "Add To Report." Using a downward hand movement, the product gets added to the current mission and can be edited through the touch interface. Using an upward hand movement, the product recommendation gets deleted. These gestures are meant to naturally convey the idea of physically moving the product down to the editor, or "flicking" it away.

The full-motion video viewer shows the current video feed from the sensor platform.

The related information view displays information related to the ongoing mission. The display may show information in the form of information cards. The supported set of information types may include information such as People, Places, Vehicles, Documents, Missions, and Products. The interface may be divided into three sections: at the top is shown "Pinned Items," which are items that the analyst has explicitly asked be shown, and will only disappear if the analyst adds additional pinned items and the interface runs out of room to show the cards. In the middle is recommended related information, which is contextual information that the contextualized human machine system proactively pushes to the user based on ongoing activity. For example, the mention of a person of interest in a chat room may trigger a query to find information related to that person, which would automatically be shown. At the bottom are search results, which may be the result of speech interaction (e.g., "Find me people connected to the cement factory") or a search initiated through the geospatial search feature of the touch interface.

The analyst workstation also includes an interface for product editing, mission status, and information exploration. On the multitouch display includes a product editor that is configured for product editing, mission status, and information exploration. At the center of product editor is a map that shows the current position and path of the sensor platform (e.g., an unmanned air vehicle), and allows for standard map touch interaction methods (e.g., pinch-to-zoom). Products that have been created in the mission so far are shown by indicators along the path. At the bottom of product editor is a mission timeline, which shows the time points at which products have been created. On the right side of product editor is a mission summary, showing a list of products that have been created, along with some information about those products such as the analyst-generated description and information that has been linked to those products. Numeric identifiers are used to link products on the map, the timeline, and summary, so that an analyst can easily find the thumbnail for a product in the summary list if they see an indicator on the map. The linkage is reinforced through interaction, with an orange border appearing around the indicator in all three representations when a product is selected.

The analyst workstation also includes a Desktop Controller (DC) runs in the background to help orchestrate all the running desktop software and enable use of operating system native technologies on the client system. Its primary responsibilities are to bridge the native code required for speech (e.g., the Microsoft Speech Recognition API) interactions with the web-based apps displayed to the analyst, provide layout services to enable reconfigurability, and serve as the connection point for potential integration with existing software tools. DC uses a plugin architecture, and custom plugins can be written as needed to connect with existing tools. Some interactions with existing tools may not need plugins. For example, our user-based automatic layout capability uses generic capabilities through standard Windows APIs.

By default, the DC includes two plugins: the layout module and the speech module. The layout module contains a window management utility and a session state machine.

The window management utility enables the layout module to configure the position and size of any window on the desktop environment. This feature is used to automatically position all the applications when a user signs into the Contextualized Human Machine System. Internally, the utility is making use of system window handles, and no third-party libraries are being used.

The session state machine controls the current setup of the applications and allowed functionality of the demonstrations. After the user signs in, all of the appropriate applications are launched and positioned accordingly.

Speech functionality comes online, and the active speech grammar is changed from a grammar with phrases like "Okay System, sign in" to a grammar with phrases like "Okay System, who is Haj Salami?"

The speech recognition module is a library built around a speech to text API. Microsoft Speech API is a suitable API because it can parse audio and produce recognition locally on the computer, without any need to communicate with an outside service. Keeping the speech recognition local allows demonstrations of contextualized human machine systems to be independent of network connectivity or up-time of a third-party service, while letting us innovate with speech enabled systems. The library built around the API allows the system to create interesting dynamic grammars. As an example, a dictionary may be constructed in real time from entities connected to a current mission in a scenario. Additionally, commands in the form of "Okay System, show me $INFOTYPE connected to $ENTITY", may be created. The "$INFOTYPE" component is list of pre-defined information types such as "People" or a generic "Information." The $ENTITY is a logical link to the constructed entity dictionary, and now our grammar will support querying of information connected to any entity. Dictionaries and commands can be added or removed in near real time.

Gesture interaction is enabled through the use of a motion sensor such as the Leap Motion sensor. The Leap may sense hands instead of whole-body sensing, it requires very low computational resources, and it is very reliable. The Leap also provides a Javascript API for use in web-based applications, so it can be directly accessed from any of the components.

Some embodiments of the contextualized human machine systems may learn the position of specific windows (e.g., chat displays) on each user's desktop over time, based on the user's personal preferences and mission tasking. Using this learned information, contextualized human machine systems will be able to automatically layout the desktop when the operator logs into the system and specifies a mission, saving the analyst a significant amount of time.

Contextualization Services Platform

The contextualization service platform uses the context platform to monitor, analyze, and augment the analyst's workspace. The context platform is a scalable, streaming, graph-centric multimodal knowledge repository designed for building context-aware user interfaces and reasoning about relationships hidden within complex data. It provides a platform for data management and analytics for the contextualized human machine system. In addition to the context platform, there are four additional services. There are two analytic services: an NLP service that includes the synonymy layer, and a recommendation service that generates recommendations through graph traversals based on events during the mission. There are also two client services: a Node.js server that provides the back-end for SystemEdit, and a map service that serves map tiles and generates static map thumbnails for use in information cards throughout the system.

The contextual services platform assists with information management by using natural language processing (NLP) on data sources such as chat logs to automatically extract key properties relating to the mission such as location names (e.g., Kandahar), events (e.g., vehicle door opens), landmarks (e.g., the production facility), and persons (e.g., Hassan Chop). Key named properties can then be referenced against available data sources and intelligence products to provide additional context and pattern of life analysis to support the mission and product generation processes. For example, if a vehicle is traveling along a route to a market, information about that market can be highlighted for additional analysis and review.

The contextual services platform uses both batch and streaming operations to include context from both large, slowly changing data sets, as well as real-time data and user interactions. For batch data ingest, it uses a series of processes to translate from static data sources to a richly linked graph model. These processes parse flat files (for example, XML, CSV), then translate the data to a property graph format. This creates entities in the system with attributes and relationships. Once the base data exists as a graph, additional processing combines multiple graph layers, infers additional relationships, and computes statistics. For streaming data ingest, it listens to incoming context change events that are produced by the various context publishers in real time, commits the changes to the graph database, triggers any necessary algorithms, and then reports the changes to any subscribing applications. It currently can receive and push information using an enterprise Java message bus as well as through HTML5 web sockets. In addition, it provides access to a RESTful web service that allows context-consuming applications to pull information by performing arbitrary graph queries.

The context platform is capable of publishing and subscribing to information various digital communication sources and streams. As a subscriber, the context platform can use the information extracted by NLP services to register for updates about key entities discussed in the chat rooms. These subscriptions provide an information baseline for annotation recommendations, which is enhanced over time as the chat conversation provides additional and more specific entity descriptions. As a producer, the context platform publishes work products. These products may be tagged with (at a minimum) properties such as the product type, mission, and key entity data (i.e., the name of the target in the image). The ability to dynamically publish and subscribe to content reduces the burden on the analyst to find new information, improving their efficiency.

Software Architecture

Figure 3:
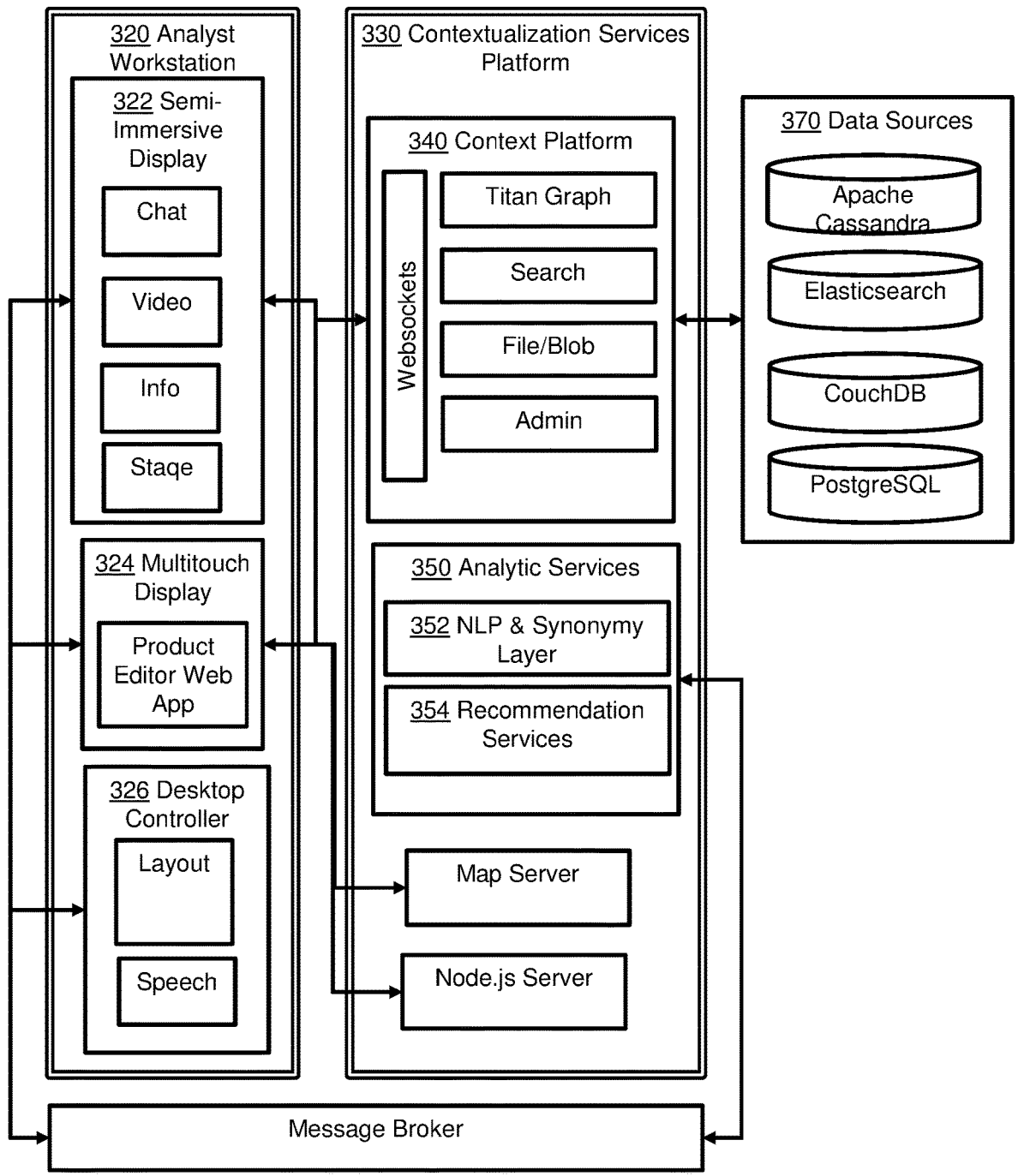
FIG. 3 shows a detailed view illustrating an example embodiment of the Contextualized Human Machine System.

A suitable system architecture for an example embodiment of a contextualized human machine systems is shown in FIG. 3. This architecture consists of contextualization services platform 330, which uses a context platform 340 along with supporting technologies to monitor, analyze, and augment the analyst's workspace, and the analyst workstation, which presents information to the analyst, processes multimodal input and coordinates with the server to monitor and analyze context.

Context Platform Details

The context platform 340 has three major functions: (1) capture the context explicitly present within the system's environment and infer implicit context; (2) analyze and reason about goals and intent (including latent knowledge) within the contextual situation as a whole; and (3) augment the system based on its understanding of the situation.

Figure 5:
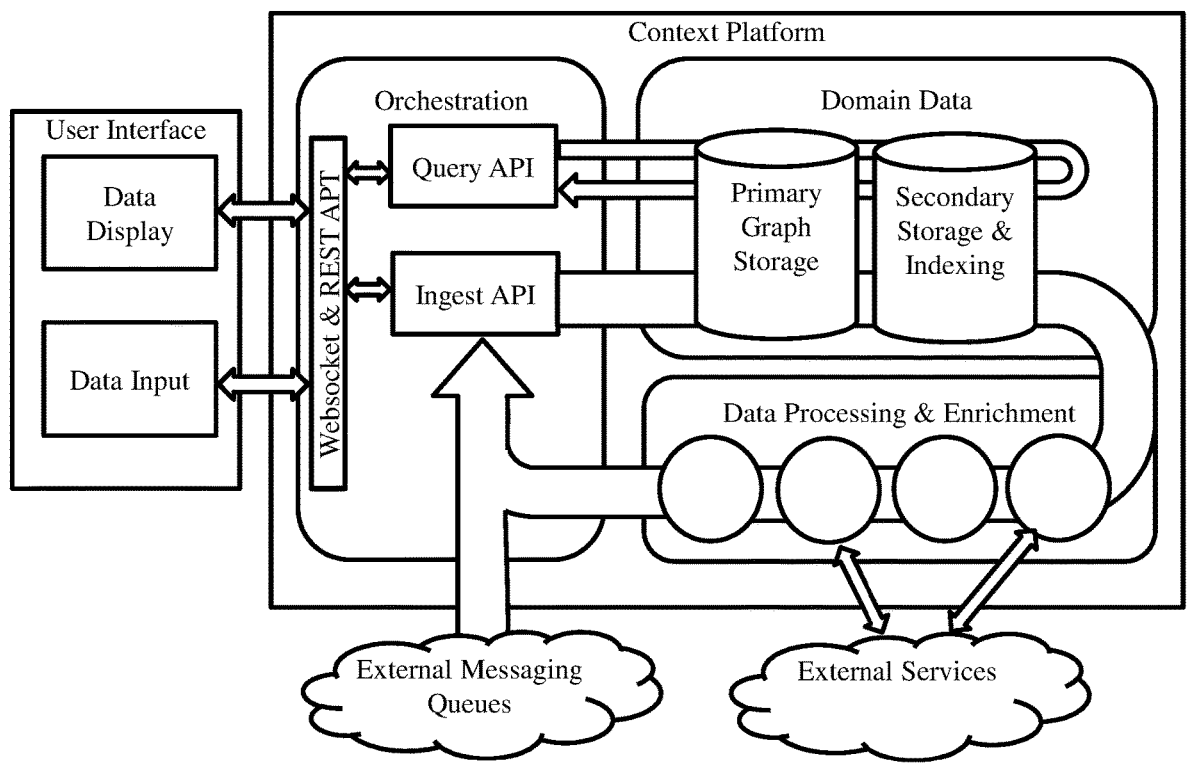
FIG. 5 illustrates an architecture diagram of an example embodiment of a context platform.

Referring to FIG. 5, the context platform serves as a runtime engine that implements a domain model, integrates with context-aware systems, and provides a mechanism for running context-based algorithms. The context platform is a scalable, streaming, graph-centric multimodal knowledge repository designed for building context-aware user interfaces and reasoning about relationships hidden within complex data. It does this by explicitly modeling an application's domain data as well as the user's interactions with that data, as one combined contextual graph. In addition, the context platform provides mechanisms for streaming and batch ingest of structured and unstructured data with storage across multiple coordinated databases (shown in FIG. 5). These synchronized databases allow for multiple query semantics (such as geospatial, full-text, or graph/relational) to cross database boundaries and feed into each other. Integration with external data services is achieved through configurable and scriptable ingest pipelines.

These requirements have been addressed by following reactive system design patterns. This means that the system is built on top of an asynchronous messaging passing infrastructure (Akka in this case) that provides mechanisms for location-transparent distributed processing and concurrency, as well as fault tolerance and elasticity. Additional architectural patterns that have inspired the design of the context platform include Event Sourcing and Command Query Responsibility Segregation. In brief, Event Sourcing means that all changes to an application's state are captured in a stream of replayable state mutation events and CQRS means that changes to the state of the system and different kinds of queries to the system can be handled by different components with different domain specific semantics.

One embodiment of the context platform utilized the Tinkerpop 3 Graph API for interacting with graph data, and usually uses the open-source Titan Distributed Graph Database implementation of Tinkerpop. Titan is configurable with multiple storage backends, but the best supported backend is Apache Cassandra. Tinkerpop's graph representation is a Property Graph model, meaning it represents data as labeled vertices and edges where each data element can have arbitrary sets of properties associated with it. This level of graph abstraction provides a nice balance between flexibility of knowledge representation and comprehensibility for developers and end users. While it does not provide the same ontological inference and first-order logic of an advanced triplestore, it is much easier to bootstrap for a new application domain and does not have nearly the same requirement for a grounding in foundational knowledge. Out of the box, a Tinkerpop graph is a schema-less collection of vertices and edges that can be traversed using the Gremlin query language, assuming you have a starting set of vertices to work from. Finding the initial set of vertices using the default indexes that are auto-generated can require a substantial scan of the vertices in the datastore which can lead to poor performance. In order to optimize performance, it is necessary to conform to some sort of schema, and provide additional indexes and keys to support common traversal start use cases. In order to provide this optimized performance, but to continue to allow a flexible/configurable schema for the end user/developer, the context platform adds an additional layer of abstraction on top of the raw Tinkerpop property graph.

Analytic Services Details. NLP and Synonymy Layer

One of the sources that the contextualized human machine system will use to reason about the current context of PED operations is chat log messages. PED analysts typically converse in short-hand and employ jargon. Standard Natural Language Processing (NLP) libraries are not trained on this type of language and may not be able to generate useful output based on unprocessed chat messages.

Figure 7A:
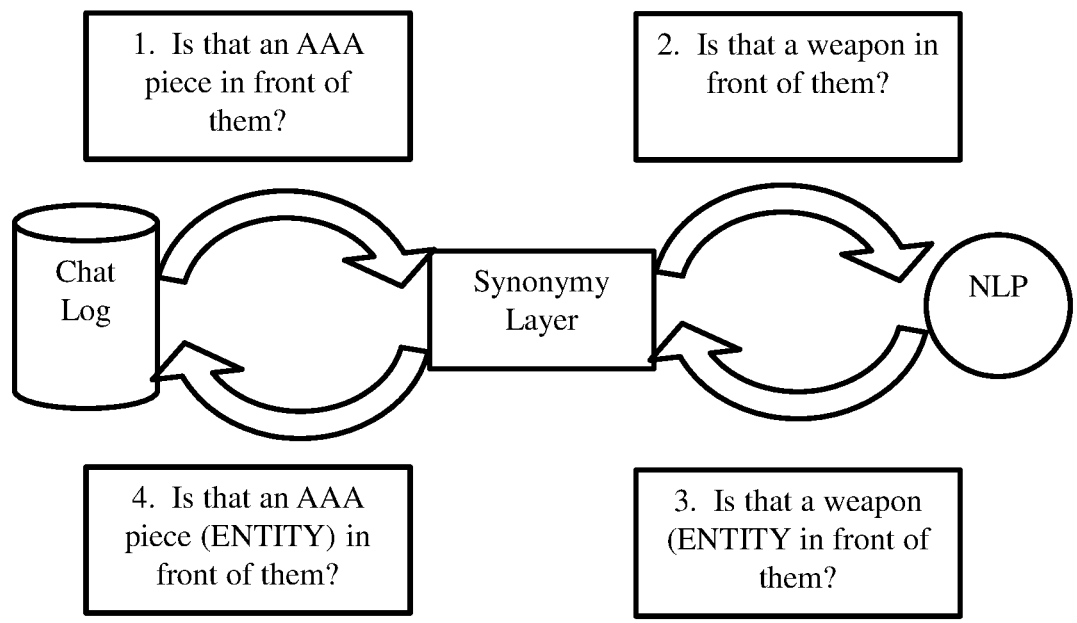
FIG. 7A is a functional diagram illustrating the function of the synonymy layer.

To address this gap, a "synonymy layer" is used as part of the analytic services, as shown in FIG. 7A. The synonymy layer translates PED chat text into language that can be understood by existing NLP technologies. In this layer, all acronyms will be converted to standard English phrases and custom domain information may generalized or translated with an index like a "jargon dictionary". With this translation, NLP technologies can parse the chat content and annotate the chat log and highlight the corresponding portions of the chat log that warrant further reasoning.

Figure 7B:
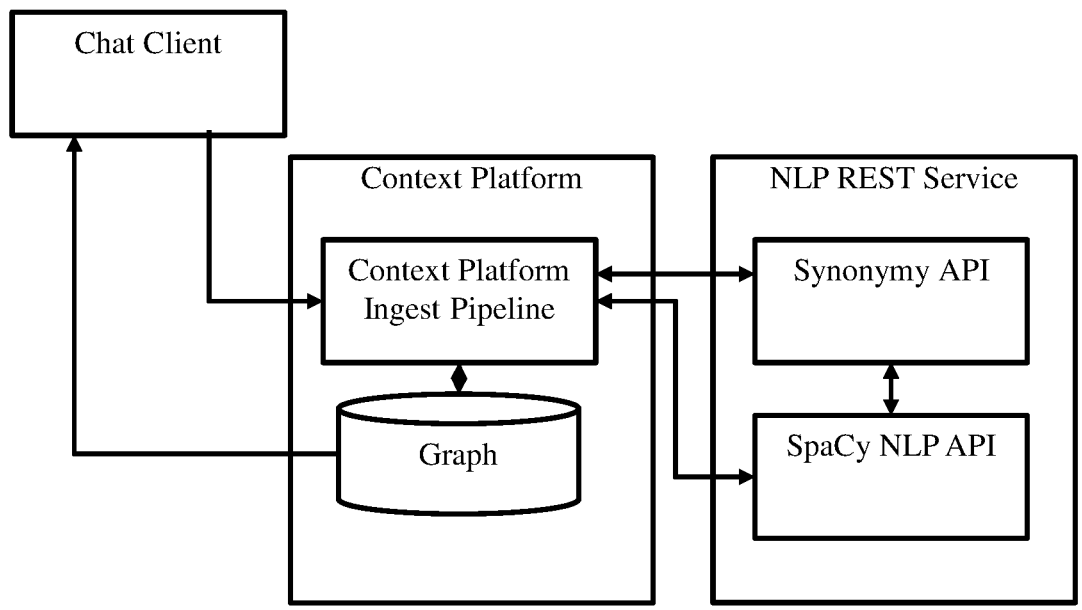
FIG. 7B is a functional diagram illustrating the function of the NLP REST service with the context platform.

Referring to FIG. 7B, the synonymy layer exists as part of an NLP REpresentational State Transfer (REST) service that allows for text processing using the following algorithms:
  Named Entity Recognition (NER) processing with the open source SpaCy library; and
  Custom domain specific information extraction using the synonymy layer.

The REST service connects to the context platform. A context platform graph schema was developed to represent NLP chat data and NLP results, and the context platform data pipeline was created to automatically process all chat messages coming into the system using the NLP service and store the results into the context platform graph. The architecture is depicted in FIG. 7B.

Analytic Services Details. Product Recommendation

Figure 8A:
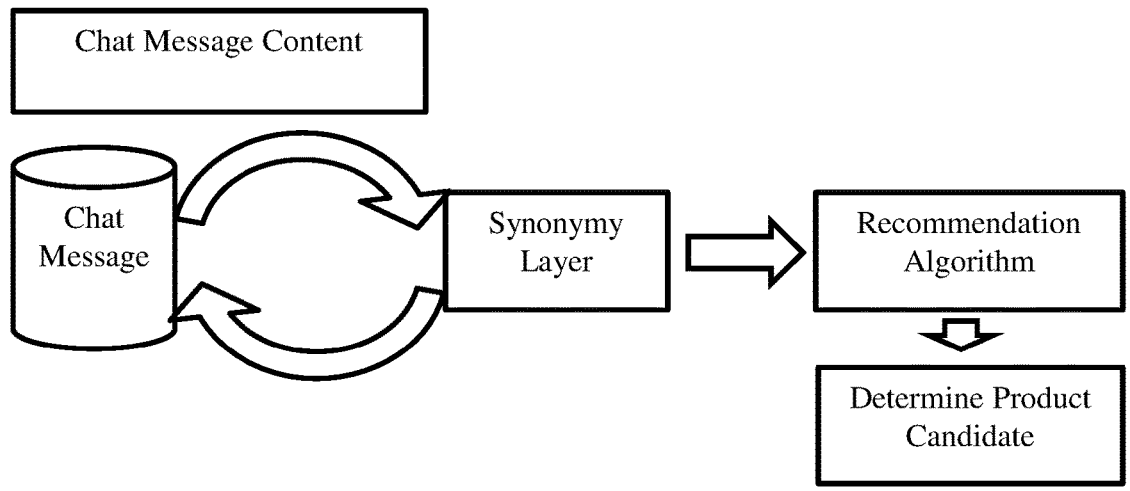
FIG. 8A is a functional diagram illustrating the function of the synonymy layer with the recommendation algorithm.

The primary application of the analytic services is to generate product recommendations. Keywords or concepts may be identified in chat messages that correspond to product candidate creation and recommendation. With this, product recommendations can be made by monitoring keywords within chats such as overview, snap, shot, snapshot, and product and select the corresponding product candidate creation and recommendation. Product candidates may also be created when time codes are included in the chat text as well. Coordinates may also trigger product candidate recommendations, and a future item of consideration is giving the analyst the ability to view MGRS and/or Latitude and Longitude when coordinates are mentioned in the chat log. As shown in FIG. 8A, the synonymy layer will identify and tag which chat messages may be a trigger for a product candidate as it processes the chat log.

Analytic Services Details. Related Information Recommendation

Figure 8B:
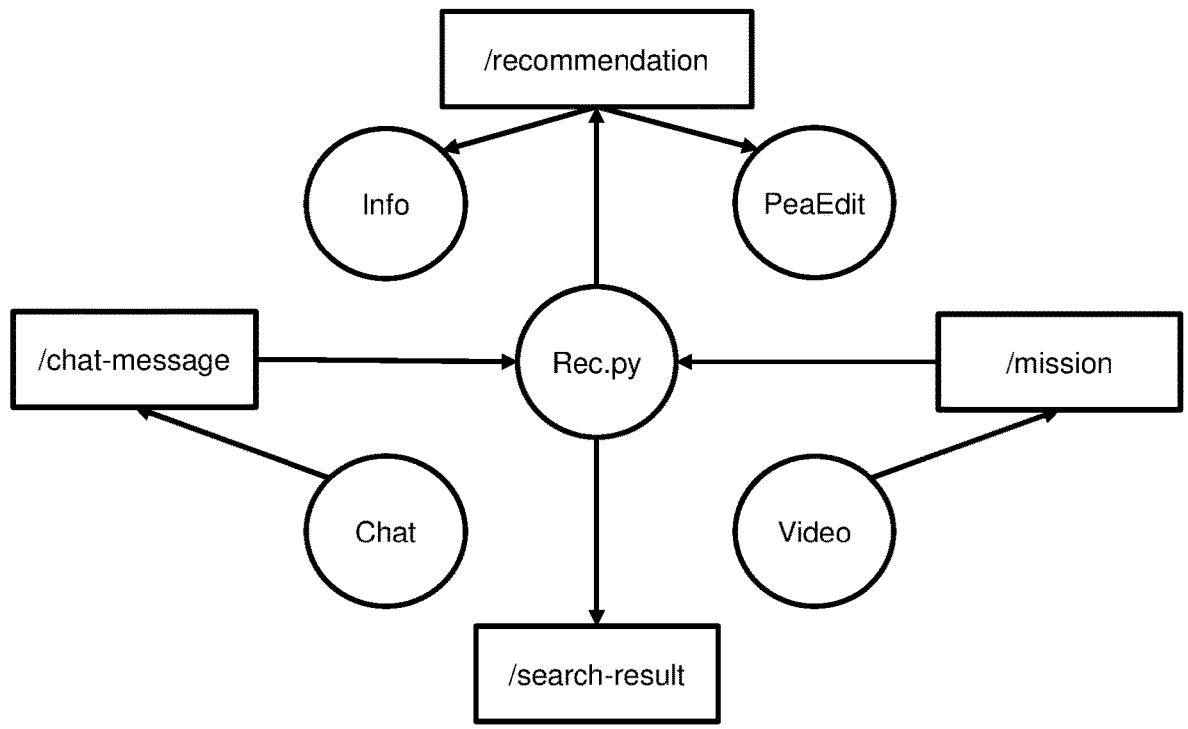
FIG. 8B illustrates an example message passing architecture for context-based recommendations.

We implemented the following messaging architecture (example shown in FIG. 8B). The boxes correspond to message topics, and the circles correspond to the various applications and processing scripts of a Contextualize Human Machine System. Rec.py corresponds to a recommendation microservice, and it receives "trigger" messages from the topics from which it has an incoming arrow (i.e., subscribed to those topics). Rec.py then creates recommendations based on the contents of those trigger messages and other contextual information. Those recommendations are then shared with other applications via the/recommendation topic.

To step through an example, suppose an analyst conducts a geospatial search for white vans in the area around the cement factory (using SystemEdit). As the analyst opens one of the search results, SystemEdit sends a message to the/search-result topic with information regarding the current search result that is being opened. Rec.py will receive this message, find related products and other entities to the search result, and then rank and send back the most relevant recommendations via the/recommendation topic. SystemEdit will receive the recommendations and display them as related information to the current search result.

Note that this flexible architecture enables us to precisely configure when recommendations will be generated and how they will be distributed. Referencing the previous example, when Rec.py published recommendations to/recommendation, the Info application could also display those recommendations.

Recommendation Algorithm

The recommendation algorithm is a graph-based recommendation algorithm that can be applied to generating recommendations of different types. The algorithm may be used to provide recommendations for historical products or the algorithm can be applied to recommending other entity types as well (e.g., people, places, past missions). Generally, the recommendation algorithm starts with the current activity node of the user and its edges with other entity nodes, traverses the knowledge graph of those entity nodes similarly connected to quantitatively identify entity nodes that are the most similar, or relevant, to the activity node. From this most relevant node and its property values, relevant recommendations can be made.

Referring to FIG. 6, the primary contextualized human machine system database is a graph database, where the vertices are the various Entities (e.g., products, people, places) and Relationships (edges) define the relationships between those entities. Given this structure, graph traversal algorithms may be used within the recommendation algorithm where, for a given start vertex, the graph traversal algorithm will traverse the graph and return a list of "relevant" vertices (i.e., entities) that it visits during its traversal. Although the system may use conventional graph traversal algorithms, this system unconventionally defines relevance through corresponding strengths of connections between entities and similarities of entities. By quantitatively defining measures for data to represent relevance, the system can mathematically define similarity and connectivity between entities in the graph, and then the recommendation algorithm can use these to produce objective and relevant recommendations.

Connection strengths are used by the recommendation algorithm as one measure to weigh potentially relevant nodes. For the recommendation algorithm, connection strength is represented as a distance property for each edge in the graph. As the algorithm traverses the graph, it will keep track of how far away, or how many steps away, from its start vertex it has traversed, measured in terms of that distance/step property; entities that are further away from the start vertex have less of a connection strength and are less relevant than entities that are closer to the start vertex.

The recommendation algorithm uses similarity as another measure to weight potentially relevant nodes. Similarity scores are enabled by quantitatively defining properties and property values for the graph vertices and edges. Given the property values for each entity/vertex, pairs of entities are made and similarity scores are determined by computing a pairwise property dissimilarity score for each of the property values.

Using mission-to-mission similarity as an example of measuring similarity, we first compute data values for the previously defined properties (e.g., measures such as target priority) and for new derived properties (e.g., measures such as number of products per minute). For Mission-to-Mission similarity, there may be nine of these properties and derived properties computed for each Mission. Then, for all missions, we compute a pairwise property dissimilarity score. This property dissimilarity score (the inverse of similarity) answers questions such as "How dissimilar is BEDROCK08 to BEDROCK04 on their target priorities?" Then, we normalize the properties dissimilarity scores from 0 to 1 so that all the scores are on the same numeric scale. Finally, we compute a mission dissimilarity score that is the average of the normalized properties dissimilarity scores. This mission dissimilarity score tells us the main question of interest "How dissimilar is BEDROCK08 to BEDROCK04?," for example. Because not all properties have equal importance for determining similarity, we may also define another mission dissimilarity score, where properties have proportional impact on the dissimilarity score relative to their importance. The final dissimilarity score we compute is a weighted average, where properties with higher importance have a higher weight.

Figure 9A:
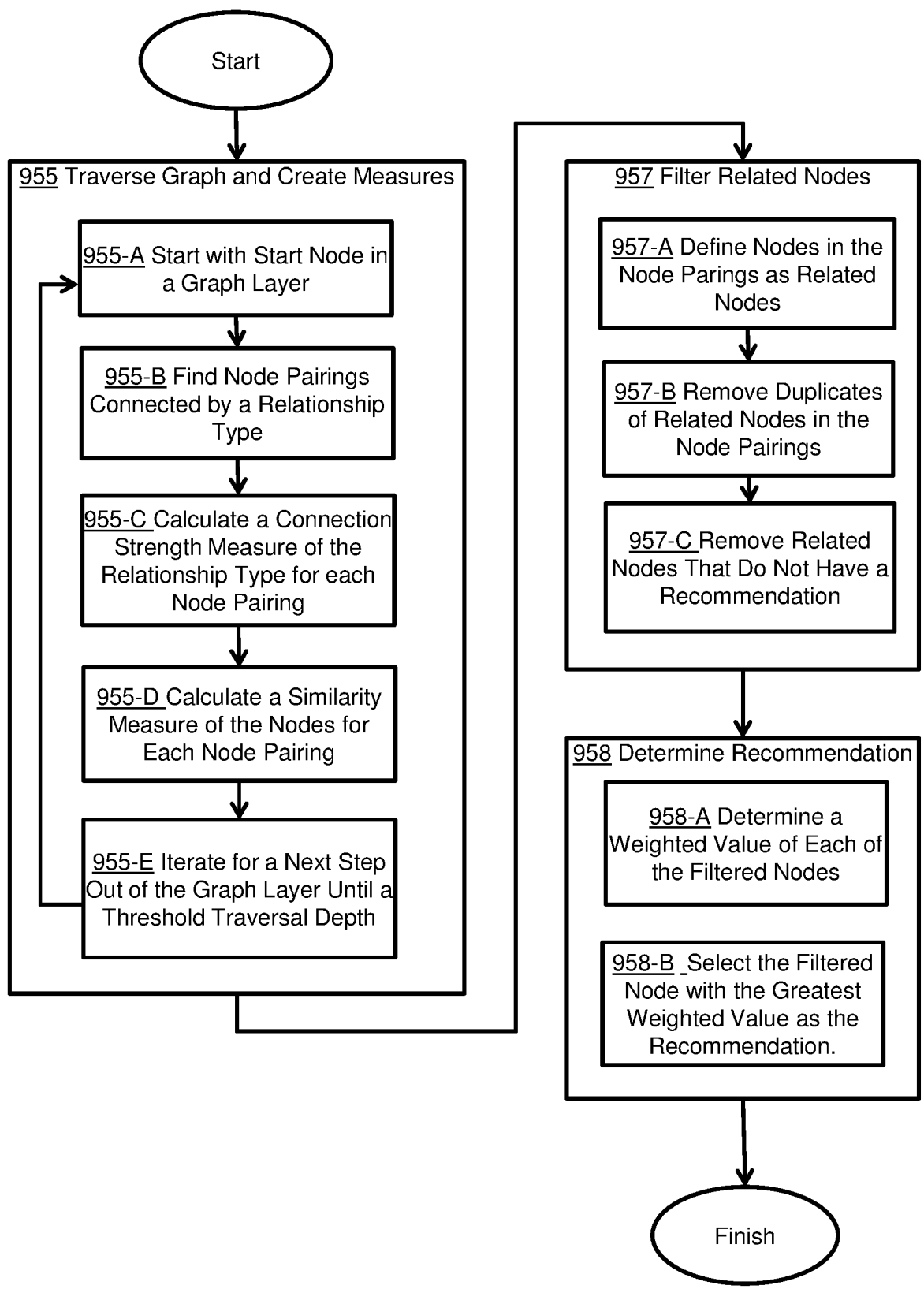
FIG. 9A a process flow chart of an example embodiment of the recommendation algorithm.

FIGS. 9A and 9B illustrate an example embodiment of a suitable recommendation algorithm. As shown in FIG. 9A, the process generally comprises traversing the knowledge graph to create measures at 955, filter related nodes at 957 and determine a recommendation from the related nodes at 958. FIG. 9A illustrated an embodiment that is suitable for a graph traversal where the start vertex may be an activity node, the relationship type may be a reference and the connect vertex may be a content node.

In FIG. 9A, traversing the multi-layer knowledge graphs at 955 generally comprise, starting with a start node in the graph layer at 955-A:
- at 955-B, identify a pairing of the start node with other nodes connected by any relationship type in a graph layer of the multi-layered knowledge graph;
- at 955-C, calculate a connection strength measure of the relationship type for the node pairings and associate the connection strength measure to each of the nodes;
- at 955-D, calculate a similarity measure of the nodes in the node pairing and associate the similarity measure to each of the nodes; and
- at 955-E, iterate steps 955-A-955-D for a next step out of the graph layer for subsequent pairings of the nodes connected by any relationships type until a threshold traversal depth of steps.

Filtering related nodes at 957 generally comprise the steps of:
- at 957-A, define each of the nodes in the node pairings and the subsequent node pairings as a plurality of related nodes;
- at 957-B, filter the plurality of related nodes by removing duplicates of related nodes to define a plurality of filtered nodes as a plurality of potential recommendations; and
- at 957-C, filter the plurality of related nodes by removing related nodes that do not have a recommendation or automation.

Determining a recommendation at 958 generally comprises the steps of:
- at 958-A, determine a weighted value of each of the plurality of filtered nodes as a function of the connection strength measure and the similarity measure; and
- at 958-B, select the filtered node with the greatest weighted value as the context-aware recommendation.

FIG. 9B illustrated an example recommendation algorithm in pseudo-code.

Temporal Properties

Furthermore, real-time adaptation of the system and real-time adaptation of contextual data and recommendations may be enabled by allowing the system to reason over multiple time scales. In addition to absolute real-world time, relative time may be considered as it passes during the course of a mission, and relative time may be considered as it relates to comparison to past data, events or process steps. For example, activity at the beginning of a mission may be interpreted differently than activity at the end of a mission, and the recency of past data may determine whether the analyst or system should prioritize its inclusion in the analysis process. By quantifying Entity and Edges with properties and property values, entities and edges may include these types of temporal properties. These properties may be more than an absolute time, but may also include a relative time of one activity entity to another or a relative time of one activity entity to a process flow.

One approach to real-time adaptation of the knowledge graph approach is with property-based representations of temporal data. This approach builds upon the notion of absolute time, which is stored as a timestamp property on all relevant content, mission, and activity nodes in the knowledge graph, and augments it with time category properties. For mission-relative events, the system dynamically generates, assigns, and persists labels on key data. For example, a node representing a product in the content layer could have a time category label "mission=id=created+01:02:00" to denote that the product was created one hour and two minutes into mission execution. Similarly, for event-relative time, the system dynamically generates and attributes labels to events observed within a mission relative to their last observation in the broader operational history. Triggers for updating the system's reasoning processes leverage a distributed event architecture keyed off of label mutations.

One Embodiment of Methods of Using the Contextualized Human Machine System:

For illustration purposes and not for limitation, one example embodiment of methods of using the contextualized human machine system is shown in FIG. 2A and generally comprises the steps of receiving input data at 210, create contextual data from the input data at 240, making a recommendation to augment or automate tasks of the user at 252 and disseminate a work product at 276.

Receiving input data at 210 is generally the system components receiving communication input data for the system user or receiving data from information sources the user is subscribed to.

Creating context data at 240 is generally the population of multi-layer knowledge graphs with properties and property values defined by the domain model and the definition of context. Context data is created by unifying input data through tools such as NLP processes or through the use of tools such as the synonymy layer. With the unified input data, vertex and relationship property values can be determined according to the domain model and these values are used to populate the appropriate knowledge graph.

Making a recommendation at 252 generally comprises the use of the recommendation algorithm on the knowledge graphs. The recommendation algorithm takes graph nodes pairs and determines a connection strength measure of the pairs and a similarity measure of the pairs. Each of the graph nodes are factored with their corresponding connection strength and similarity measures to define a ranking of relevancy of the nodes and the most relevant node is then used as the recommendation.

One Example Embodiment of a Contextualized Human Machine System Implemented in a Software Program Product Executed by a Processor-Based System:

As will be readily apparent to those skilled in the art, one embodiment of the contextualized human machine system and methods can be embodied in hardware, software, or a combination of hardware and software. For example, a computer system or server system, or other computer implemented apparatus combining hardware and software adapted for carrying out the methods described herein, may be suitable. One embodiment of a combination of hardware and software could be a computer system with a computer program that, when loaded and executed, carries out the respective methods described herein. In some embodiments, a specific use computer, containing specialized hardware or computer programming for carrying out one or more of the instructions of the computer program, may be utilized. In some embodiments, the computer system may comprise a device such as, but not limited to a digital phone, cellular phone, laptop computer, desktop computer, digital assistant, server or server/client system.

Computer program, software program, program, software or program code in the present context mean any expression, in any language, code or notation, of a set of instructions readable by a processor or computer system, intended to cause a system having an information processing capability to perform a particular function or bring about a certain result either directly or after either or both of the following: (a) conversion to another language, code or notation; and (b) reproduction in a different material form. A computer program can be written in any form of programming language, including compiled or interpreted languages, and it can be deployed in any form, including as a stand-alone program or as a module, component, subroutine, or other unit suitable for use in a computing environment.

Figure 10:
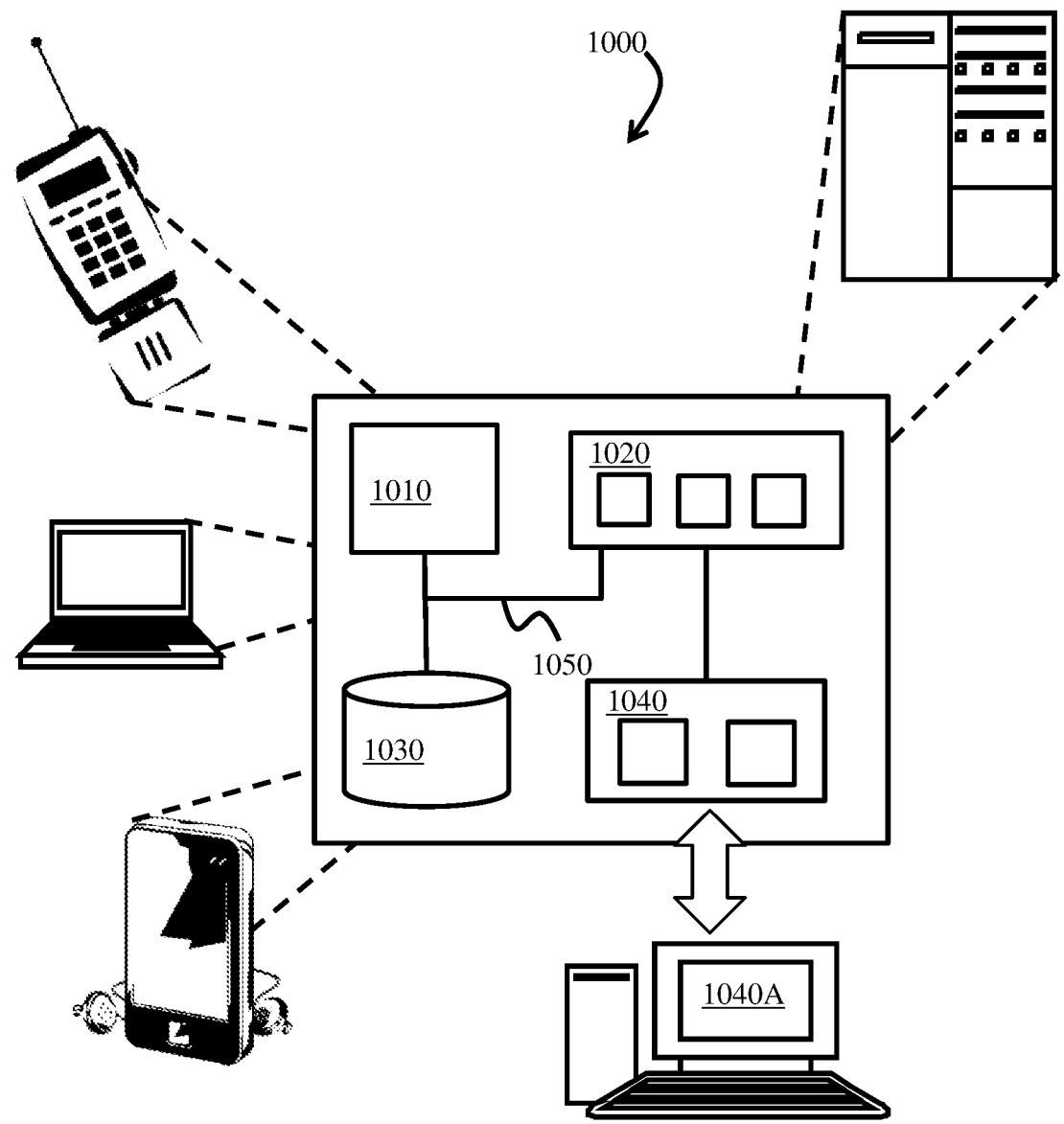
FIG. 10 illustrates one example embodiment of a computer system suitable for a contextualized human machine systems system.

FIG. 10 is a schematic diagram of one embodiment of a computer system 1000 by which the contextualized human machine system methods of use may be carried out. The computer system 1000 can be used for the operations described in association with any of the computer implemented methods described herein. The computer system 1000 includes at least one processor 1010, a memory 1020 and an input/output device 1040. Each of the components 1010, 1020, and 1040 are operably coupled or interconnected using a system bus 1050. The computer system 1000 may further comprise a storage device 1030 operably coupled or interconnected with the system bus 1050.

The processor 1010 is capable of receiving the instructions and/or data and processing the instructions of a computer program for execution within the computer system 1000. In some embodiments, the processor 1010 is a single-threaded processor. In some embodiments, the processor 1010 is a multi-threaded processor. The processor 1010 is capable of processing instructions of a computer stored in the memory 1020 or on the storage device 1030 to communicate information to the input/output device 1040. Suitable processors for the execution of the computer program instruction include, by way of example, both general and special purpose microprocessors, and a sole processor or one of multiple processors of any kind of computer.

The memory 1020 stores information within the computer system 1000. Memory 1020 may comprise a magnetic disk such as an internal hard disk or removable disk; a magneto-optical disk; an optical disk; or a semiconductor memory device such as PROM, EPROM, EEPROM or a flash memory device. In some embodiments, the memory 1020 comprises a transitory or non-transitory computer readable medium. In some embodiments, the memory 1020 is a volatile memory unit. In another embodiments, the memory 1020 is a non-volatile memory unit.

The processor 1010 and the memory 1020 can be supplemented by, or incorporated in, ASICs (application-specific integrated circuits).

The storage device 1030 may be capable of providing mass storage for the system 1000. In various embodiments, the storage device 1030 may be, for example only and not for limitation, a computer readable medium such as a floppy disk, a hard disk, an optical disk, a tape device, CD-ROM and DVD-ROM disks, alone or with a device to read the computer readable medium, or any other means known to the skilled artisan for providing the computer program to the computer system for execution thereby. In some embodiments, the storage device 1030 comprises a transitory or non-transitory computer readable medium.

In some embodiments, the memory 1020 and/or the storage device 1030 may be located on a remote system such as a server system, coupled to the processor 1010 via a network interface, such as an Ethernet interface.

The input/output device 1040 provides input/output operations for the system 1000 and may be in communication with a user interface 1040A as shown. In one embodiment, the input/output device 1040 includes a keyboard and/or pointing device. In some embodiments, the input/output device 1040 includes a display unit for displaying graphical user interfaces or the input/output device 1040 may comprise a touchscreen. In some embodiments, the user interface 1040A comprises devices such as, but not limited to a keyboard, pointing device, display device or a touchscreen that provides a user with the ability to communicate with the input/output device 1040.

The computer system 1000 can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, wireless phone networks and the computers and networks forming the Internet.

One example embodiment of the contextualized human machine system and methods of use may be embodied in a computer program product, the computer program product comprising a computer readable medium having a computer readable program code tangibly embodied therewith, the computer program code configured to implement the methods described herein, and which, when loaded in a computer system comprising a processor, is able to carry out these methods.

One Embodiment of the Contextualized Human Machine System in Operation:

For purposes of illustrating the operation of one embodiment of a Contextualized Human Machine System, and not for limitation, the operation of a contextualized human machine system assembly for an intelligence analyst is described.

For one vision of the system in operation, imagine an intelligence analyst sitting at her workstation surrounded by large, semi-immersive displays with a pressure-sensitive multi-touch display at her fingertips. As video data streams in, a message on her semi-immersive display indicates a cross-cue from a peer analyst. Tapping her touchscreen, she sends a message to the Unmanned Arial Vehicle (UAV) crew to request a view of that location, with the coordinates automatically encoded into the message. As the sensor view moves to the new location, she verbally requests additional information about a potential person of interest, which shows up on the semi-immersive display, along with connections to other entities and reports. Once the UAV arrives at the new location, the system automatically cues up a still-image product for her to annotate. She uses a hand gesture to bring the cued product down to her touch screen, where she taps to identify the vehicle of a person of interest, which is automatically labelled with a visual annotation. As she creates additional products, the embedded context-engine brings up historical imagery, representative targets, open-source reports, geospatial intelligence, and human-intelligence related to the targets of interest. Using a combination of touch, gesture, and voice, she quickly assembles a detailed product for the supported unit and sends it on for review.

Example Use Case—Full Motion Video Analyst

An example use case for a contextualized human machine system is focused on enabling the FMV Analyst. The use case addresses four key areas-workspace management, information management, assistive product generation, and product dissemination as discussed below.

Context-Aware Information Management. Operators functioning in the FMV Analyst role rely primarily on two types of data, the raw imagery and video captured on the ISR platform, and the annotations of that raw data by the PED Cell analysts. The latter is the source of a significant amount of the contextual information used by the supported commander. For this effort, we assume that the eyes-on FMV Analyst is supported by a Speech to Text for Enhanced PED (STEP) system, which translates their call-outs into text that transmits them into the chat system for dissemination to the crew. The contextualized human machine system assists with information management by using natural language processing (NLP) on chat logs to automatically extract key entities relating to the mission such as location names (e.g., Kandahar), events (e.g., vehicle door opens), landmarks (e.g., the production facility), and persons (e.g., Hassan Chop). Key named entities can then be referenced against available data sources and intelligence products to provide additional context and pattern of life analysis to support the mission and product generation processes. For example, if a vehicle is traveling along a route to a market, information about that market can be highlighted for additional analysis and review.

Assistive Product Generation. The contextualized human machine system assisted analysts in the creation of still products and portions of a dynamic mission storyboard. To do this, the system leverages context-aware reasoning capabilities that process information both always-on (i.e., runs constantly throughout the course of the mission) and on-demand (i.e., when the user explicitly tells the system to perform an action). One example of always-on reasoning is the NLP of chat logs, which extract key entities and actions from chat logs and associates those data with a temporal context. An example of on-demand reasoning is the automated retrieval of relevant data when creating a product. These two types of reasoning capabilities interact with each other to enable more efficient product creation.

For example, during a find-fix-track mission, the supported unit says "get a snap of this" to the PED crew over chat. The system uses NLP to extract the supported unit's request (i.e., create a still product), and uses the timestamp of the chat message to automatically extract a frame from the FMV feed that is then loaded into the Product Staging Area. Next, the FMV Analyst uses a "grab" gesture to bring the still down from the Product Staging Area into the Editor, where they will add annotations. When the still loads in the Editor, the workstation shows potentially relevant annotations next to the image, based on the content and context of the chat logs on either side of the still's timestamp. The FMV Analyst drags the annotations they want out onto the image, giving them appropriate anchors, adds any annotations not recommended by the system, and saves the product. When the system is notified of the "save" action, it automatically pushes the still to the next stage of the quality assurance process. Once the still has completed the quality assurance process, it is delivered to the supported unit and automatically added to the mission storyboard and target log based on the extracted temporal (and spatial) context.

Product Dissemination. When complete, the final products are automatically generated in both interactive and PowerPoint forms and linked to an email for distribution to be sent out as needed. Additionally, the interactive timeline and geospatial narrative has also become its own product for use that can be distributed, linked, and shared as required, as well as saved to be referenced as needed for context in future missions.

A demonstration scenario for is the contextualized human machine system was built upon a traditional ISR example. For example, a PED crew has been tasked with a Find, Fix, and Track of three actors in a terrorist cell suspected of executing several recent IED attacks against US forces—Hassan Chop, the cell leader, and his two lieutenants Haj Salami and Abu Aziz. The products of their work will be utilized by the command staff of the supported unit to inform the planning of a future strike operation against this cell. Additionally, their products will be leveraged by their associated Analysis and Reporting Team to inform pattern of life development for each of the three actors. This demonstration scenario included an FMV dataset and operationally relevant pre-mission brief.

FMV Dataset. Video were obtained and corresponding chat logs were created that are representative of real mission data streams with the location of interest as Kandahar, Afghanistan.

Pre-Mission Brief. A simulated slide deck was created to serve as the pre-mission brief. These slides provided an overview of: (1) the target area, collection requirements, and background intelligence reporting; (2) intelligence about three members of the target cell; and (3) a close-up photograph of the target installation where the target cell members are believed to be residing.

Although this invention has been described in the above forms with a certain degree of particularity, it is understood that the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention which is defined in the claims and their equivalents.

REFERENCES

The publication and other material used herein to illuminate the invention or provide additional details respecting the practice of the invention, are incorporated be reference herein, and for convenience are provided in the following bibliography.

Citation of the any of the documents recited herein is not intended as an admission that any of the foregoing is pertinent prior art. All statements as to the date or representation as to the contents of these documents is based on the information available to the applicant and does not constitute any admission as to the correctness of the dates or contents of these documents.

Baskerville, R. L., and Wood-Harper, A. T., "A critical perspective on action research as a method for information systems research," *Journal of information Technology*, vol. 11, no. 3, pp. 235-246, 1996.

Bolt, R. A., ""Put-that-there": Voice and gesture at the graphics interface," in *Proceedings of SIGGRAPH '80*, 1980, pp. 262-270.

Brooke, J. (1986). System usability scale (SUS): a quick-and-dirty method of system evaluation user information. *Reading, UK: Digital Equipment Co Ltd*. 43.

Brown, P. J., Bovey, J. D., and Chen, X. Context-Aware Applications: From the Laboratory to the Marketplace. IEEE Personal Communications, 4(5) (1997) 58-64 4.

Chen, J., Narayan, M. A., and Pérez-Quiñones, M. A. "The use of hand-held devices for search tasks in virtual environments," in *Proceedings of the IEEE Symposium on 3D User Interfaces*, 2005, pp. 91-98.

Coffey, D., Malbraaten, N., Le, T., Borazjani, I., Sotiropoulos, F., Erdman, A., et al., "Interactive Slice WIM: Navigating and Interrogating Volume Datasets Using a Multi-Surface, Multi-Touch VR Interface," *IEEE Transactions on Visualization and Computer Graphics*, vol. 18, pp. 1614-1626, 2012.

De Villiers, M. "Three approaches as pillars for interpretive information systems research: development research, action research and grounded theory," in *Proceedings of the 2005 annual research conference of the South African institute of computer scientists and information technologists on IT research in developing countries*, pp. 142-151, South African Institute for Computer Scientists and Information Technologists, 2005.

Dörk, M., Carpendale, S., Collins, C., & Williamson, C. (2008). Visgets: Coordinated visualizations for web-based information exploration and discovery. *IEEE Transactions on Visualization and Computer Graphics*, 14(6), 1205-1212.

Fouse, A., Mullins, R. S., Ganberg, G., and Weiss, C. (to appear). The Evolution of User Experiences and Interfaces for Delivering Context-Aware Recommendations to Information Analysts. In, *Applied Human Factors and Ergonomics, Eighth Annual Conference on*.

Fouse, A., Pfautz, S., and Ganberg, G. "Context-Aware Systems for Complex Data Analysis." HCI International 2015-Posters' Extended Abstracts. Springer International Publishing, 2015. 503-507.

Fouse. A., Weiss, C., Mullins, R., Hanna, C., Nargi, B., & Keefe, D. F. (2018, June). Multimodal Interactions In Multi-Display Semi-Immersive Environments. In 2018 *IEEE Conference on Cognitive and Computational Aspects of Situation Management (CogSIMA)* (pp. 36-41). IEEE.

Fowler, M. *Event sourcing.* http://martinfowler.com/eaaDev/EventSourcing, 2005

Fowler, M. CQRS. http://martinfowler.com/bliki/CQRS.html, 2011

Gerhardt-Powals, J.: Cognitive engineering principles for enhancing human-computer performance. *International Journal of Human-Computer Interaction.* 8, 189-211 (1996)

Gomez-Uribe, C. A., and Hunt, N. "The Netflix recommender system: Algorithms, business value, and innovation," *ACM Transactions on Management Information Systems (TMIS),* vol. 6, no. 4, p. 13, 2016

Linden, G., Smith, B., and York, J. "Amazon. com recommendations: Item-to-item collaborative filtering," *IEEE Internet computing,* no. 1, pp. 76-80, 2003

López, D., Oehlberg, L., Doger, C., and Isenberg, T. "Towards an Understanding of Mobile Touch Navigation in a Stereoscopic Viewing Environment for 3D Data Exploration," *IEEE Transactions of Visualization and Computer Graphics,* vol. 22, pp. 1616-1629, 2015 2015.

Mullins, R. S., Fouse, A., Ganberg, G., & Schurr, N. (2020). Practice Makes Perfect: Lessons Learned from Five Years of Trial and Error Building Context-Aware Systems. In *Proceedings of the 53rd Annual Hawaii International Conference on Systems Science.*

Nielsen, J. Heuristic evaluation. In Nielsen, J., and Mack, R. L. (Eds.), Usability inspection methods. John Wiley & Sons, New York, NY. (1994).

Oviatt, Sharon, 2003. Multimodal interfaces. In The human-computer interaction handbook: Fundamentals, evolving technologies and emerging applications 14 (2003): 286-304.

Paulheim, H. (2017). Knowledge graph refinement: A survey of approaches and evaluation methods. *Semantic web,* 8(3), 489-508.

Pfautz, S. L, Ganberg, G., Fouse, A., and Schurr, N. (2015). A General Context-Aware Framework for Improved Human-System Interactions. AI Magazine, 36(2), 42-49.

Roberts, J. C. (2007, July). State of the art: Coordinated & multiple views in exploratory visualization. In *Fifth International Conference on Coordinated and Multiple Views in Exploratory Visualization (CMV 2007)* (pp. 61-71). IEEE.

Rodriguez, M. A., Shinavier, J., "Exposing Multi-Relational Networks to Single-Relational Network Analysis Algorithms," *Journal of Informetrics,* 4(1), pp. 29-41, Elsevier, 2009.

Schilit, Bill, Norman Adams, and Roy Want. "Context-aware computing applications." *Mobile Computing Systems and Applications,* 1994. WMCSA 1994. *First Workshop on.* IEEE, 1994.

Singhal, A. "Introducing the knowledge graph: things, not strings," *Official google blog,* vol. 5, 2012.

Wharton, C. "The cognitive walkthrough method: A practitioner's guide," *Usability inspection methods,* 1994.

Wickens, C. D. (2002). Multiple resources and performance prediction. *Theoretical issues in ergonomics science,* 3(2), 159-177.

Zheng, Y., Tang, B., Ding, W., and Zhou, H. "A neural autoregressive approach to collaborative filtering," *arXiv preprint arXiv:* 1605.09477, 2016

We claim:

1. A contextualized human machine system configured to automatically determine a context-aware recommendation to a user, the system comprising:
   a context platform configured to receive an input data from an analyst workstation;
   the context platform configured to automatically define, from the input data, a first property value of a first node corresponding to a multi-layer knowledge graph;
   the context platform configured to define a second property value of a second node of the multi-layer knowledge graph;
   the second node comprising a content node comprising a work product;
   the first node and the second node comprising a node pairing;
   the context platform defining a relationship property value of a relationship type between the first node and the second node;
   a recommendation engine configured to execute a recommendation algorithm to automatically determine a context-aware recommendation of a third node based on a connection strength measure and a similarity measure;
   communicating the second node and the third node to the analyst workstation as an augmented work product; and
   wherein the recommendation algorithm comprises a graph traversal algorithm configured to:
   (a) identify one or more additional node pairing of the first node connected by any relationship type to another node in a graph layer of the multi-layered knowledge graph;
   (b) calculate a connection strength measure of the relationship type for each additional node pairing and associate the connection strength measure to each of the nodes in the additional node pairing;
   (c) calculate a similarity measure of the nodes in each additional node pairing and associate the similarity measure to each of the nodes in the additional node pairing;
   (d) iterate steps (a)-(c) for a next step out of the graph layer for subsequent node pairings connected by any relationships type until a threshold traversal depth of steps;
   (e) define each of the nodes in the each of the additional node pairings and the subsequent node pairings as a plurality of related nodes;
   (f) filter the plurality of related nodes to define a plurality of filtered nodes as a plurality of potential recommendations;
   (g) determine a weighted value of each of the plurality of filtered nodes as a function of the connection strength measure and the similarity measure; and
   (h) select the filtered node with the greatest weighted value as the context-aware recommendation.

2. The contextualized human machine system of claim 1 wherein the input data comprises a chat message.

3. The contextualized human machine system of claim 1 wherein the input data comprises a representation of a user activity with a user interface.

4. The contextualized human machine system of claim 1 further comprising a synonymy layer configured to translate the input data to match the first property value and the second property value as defined by a pre-defined domain model.

5. The contextualized human machine system of claim 1 wherein the first node comprises an activity node and the second node comprises the content node.

6. The contextualized human machine system of claim 5 wherein the content node comprises a current work product and the third node comprises a prior work product.

7. The contextualized human machine system of claim 5 wherein the third node comprises one selected from the group consisting of:

one or more video products;
one or more hyperlink to information; and
one or more suggestions for annotating a product.

8. The contextualized human machine system of claim 5 wherein the context platform is further configured to:
define an actor property value of an actor node of the multi-layer knowledge graph; and
define a mission property value of a mission node of the multi-layer knowledge graph.

9. The contextualized human machine system of claim 5 wherein the first property value is an activity property value of the activity node automatically determined by applying a natural language processing algorithm to the input data.

10. The contextualized human machine system of claim 5 wherein the second property value is a content property value of the content node automatically determined by applying a natural language processing algorithm to the input data.

11. The contextualized human machine system of claim 5 wherein the relationship property value of a relationship type between the content node and the activity node is automatically determined by applying a natural language processing algorithm to the input data.

12. The contextualized human machine system of claim 1 wherein:
the connection strength measure comprises a decreasing value reflecting a number of next steps out of the graph layer the node pairing is located whereby the more next steps out of the graph layer the node pairing is located the smaller the connection strength measure; and
the similarity measure comprises a normalized pairwise similarity measure of the property values of the nodes in the node pairing whereby the more similar the property values are the higher the similarity measure.

13. The contextualized human machine system of claim 1 wherein filter the plurality of related nodes to define a plurality of filtered nodes as a plurality of potential recommendations comprises:
(i) remove duplicates of related nodes; and
(ii) remove related nodes that do not have a recommendation or automation.

14. The contextualized human machine system of claim 1 wherein the function of the connection strength measure and the similarity measure to determine the weighted value of each of the plurality of filtered nodes comprises a mathematical product of the connection strength measure and the similarity measure.

15. A processor-based method of automatically determining a context-aware recommendation to a user of a processor-based human machine system, the method comprising:
receiving, with a processor, an input data from an analyst workstation in the processor-based human machine system;
defining, with the processor automatically from the input data, an activity property value of an activity node corresponding to a multi-layer knowledge graph;
defining, with the processor, a content property value of a content node of the multi-layer knowledge graph;
the content node comprising a work product;
defining, with the processor, a relationship property value of a relationship type between the content node and the activity node;
the content node and the activity node comprising a node pairing;
executing, with the processor, a recommendation algorithm to automatically determine a context-aware recommendation for a second activity node or a second content node based on a connection strength measure and a similarity measure;
communicating, with the processor, the content node and one of the second activity node or the second content node to the analyst workstation as an augmented work product; and
the recommendation algorithm comprises a graph traversal algorithm configured to execute, with the processor, the method of:
(a) identifying one or more additional node pairing of the activity node connected by any relationship type to another node in a graph layer of the multi-layered knowledge graph;
(b) calculating a connection strength measure of the relationship type for each additional node pairing and associate the connection strength measure to each of the nodes in the additional node pairing;
(c) calculating a similarity measure of the nodes in each additional node pairing and associate the similarity measure to each of the nodes in the additional node pairing;
(d) iterating steps (a)-(c) for a next step out of the graph layer for subsequent node pairs of nodes connected by any relationships type until a threshold traversal depth of steps;
(e) defining each of the nodes in the each of the additional node pairings and the subsequent node pairings as a plurality of related nodes;
(f) filtering the plurality of related nodes to define a plurality of filtered nodes as a plurality of potential recommendations;
(g) determining a weighted value of each of the plurality of filtered nodes as a function of the connection strength measure and the similarity measure; and
(h) selecting the filtered node with the greatest weighted value as the context-aware recommendation.

\* \* \* \* \*